(12) United States Patent
Sze et al.

(10) Patent No.: US 12,255,816 B2
(45) Date of Patent: *Mar. 18, 2025

(54) PACKET TRANSMISSION SYSTEM AND METHOD

(71) Applicant: DEJERO LABS INC., Waterloo (CA)

(72) Inventors: David Sze, Waterloo (CA); Bogdan Frusina, Kitchener (CA); Jonathon Oberholzer, Waterloo (CA); Bernard Wong, Waterloo (CA); Sharon Hui Lun Choy, Kanata (CA); Todd Schneider, Waterloo (CA)

(73) Assignee: DEJERO LABS INC., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,010

(22) Filed: Jan. 15, 2024

(65) Prior Publication Data
US 2024/0163212 A1 May 16, 2024

Related U.S. Application Data

(63) Continuation of application No. 17/903,024, filed on Sep. 5, 2022, now Pat. No. 11,876,711, which is a
(Continued)

(51) Int. Cl.
*H04L 45/74* (2022.01)
*H04L 12/66* (2006.01)
(Continued)

(52) U.S. Cl.
CPC .............. *H04L 45/74* (2013.01); *H04L 12/66* (2013.01); *H04L 41/0896* (2013.01);
(Continued)

(58) Field of Classification Search
CPC ..... H04L 45/74; H04L 12/66; H04L 41/0896; H04L 43/0852; H04L 43/0882;
(Continued)

(56) References Cited

U.S. PATENT DOCUMENTS

| 6,754,228 B1 * | 6/2004 | Ludwig | H04L 47/193 370/231 |
| 6,778,495 B1 * | 8/2004 | Blair | H04L 45/302 370/395.32 |

(Continued)

OTHER PUBLICATIONS

United States Patent & Trademark Office (USPTO), Non Final Rejection issued to U.S. Appl. No. 17/903,024, filed Feb. 16, 2023.
(Continued)

*Primary Examiner* — Kibrom T Hailu
(74) *Attorney, Agent, or Firm* — Norton Rose Fulbright Canada LLP

(57) ABSTRACT

A network gateway is provided for routing data flows across a plurality of network connections, the network gateway including a plurality of network interfaces for transmitting data over the plurality of network connections, the plurality of network interfaces including a first network interface; at least one processor configured for: transmitting a sequential burst of packets across the first network interface; based on timestamps recorded when packets in the sequential burst of packets are received at a receiving node, and the size of the packets, generating a bandwidth of the first network interface; and routing a data flow of sequential packets across the plurality of network connections based on the generated bandwidth of the first network interface.

19 Claims, 20 Drawing Sheets

Related U.S. Application Data continuation of application No. 16/482,972, filed as application No. PCT/CA2017/051584 on Dec. 21, 2017, now Pat. No. 11,438,265.

(60) Provisional application No. 62/558,610, filed on Sep. 14, 2017, provisional application No. 62/437,635, filed on Dec. 21, 2016.

(51) Int. Cl.
| | |
|---|---|
| *H04L 41/0896* | (2022.01) |
| *H04L 43/0852* | (2022.01) |
| *H04L 43/0882* | (2022.01) |
| *H04L 43/106* | (2022.01) |
| *H04L 45/00* | (2022.01) |
| *H04L 45/302* | (2022.01) |
| *H04L 47/125* | (2022.01) |
| *H04L 47/2483* | (2022.01) |
| *H04L 47/34* | (2022.01) |
| *H04L 49/90* | (2022.01) |

(52) U.S. Cl.
CPC ...... *H04L 43/0852* (2013.01); *H04L 43/0882* (2013.01); *H04L 43/106* (2013.01); *H04L 45/22* (2013.01); *H04L 45/302* (2013.01); *H04L 47/125* (2013.01); *H04L 47/2483* (2013.01); *H04L 47/34* (2013.01); *H04L 49/90* (2013.01)

(58) Field of Classification Search
CPC ..... H04L 43/106; H04L 45/22; H04L 45/302; H04L 47/125; H04L 47/2483; H04L 47/34; H04L 49/90; H04L 47/283
See application file for complete search history.

(56) References Cited

U.S. PATENT DOCUMENTS

| | | | |
|---|---|---|---|
| 7,543,052 B1* | 6/2009 | Cesa Klein | H04L 43/026 |
| | | | 709/224 |
| 11,438,265 B2 | 9/2022 | Sze et al. | |
| 11,876,711 B2* | 1/2024 | Sze | H04L 12/66 |
| 2011/0149751 A1* | 6/2011 | Li | H04L 41/147 |
| | | | 370/252 |
| 2015/0124603 A1* | 5/2015 | Ketheesan | H04W 24/08 |
| | | | 370/252 |
| 2016/0094465 A1* | 3/2016 | Park | H04L 43/026 |
| | | | 370/235 |

OTHER PUBLICATIONS

Canadian Intellectual Property Office (CIPO), Examiner's Requisition to CA 3,048,055, Mar. 14, 2024.
Japanese Patent Office, Notice of Reasons for Rejection to JP 2022-172589, Jan. 23, 2024.
European Patent Office (EPO), Extended European Search Report to EP 24187318, dated Jul. 29, 2024.
Goodput-Aware Load Distribution for Real-Time Traffic over Multipath Networks, Jiyan Wu et al., dated Aug. 1, 2025.
PathChirp: Efficient Available Bandwidth Estimation for Network Paths, Vinay J. Ribeiro et al., dated Apr. 1, 2023.

* cited by examiner

Continuing with the interrupt latency example, what if there are no standalone packets at the start of the burst?
i.e. What if trimming from the start is not possible?

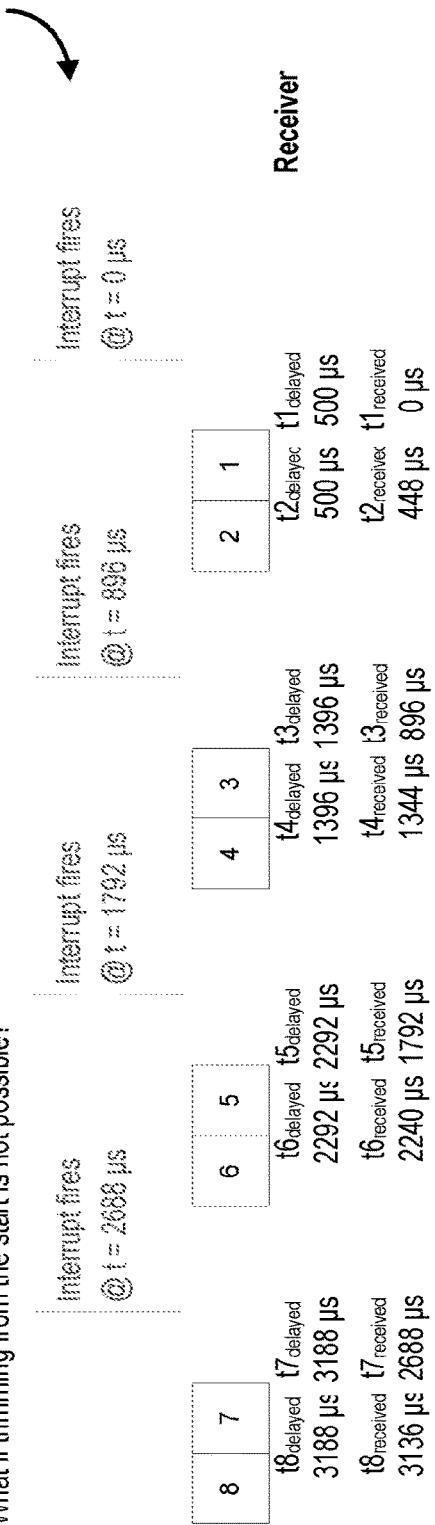

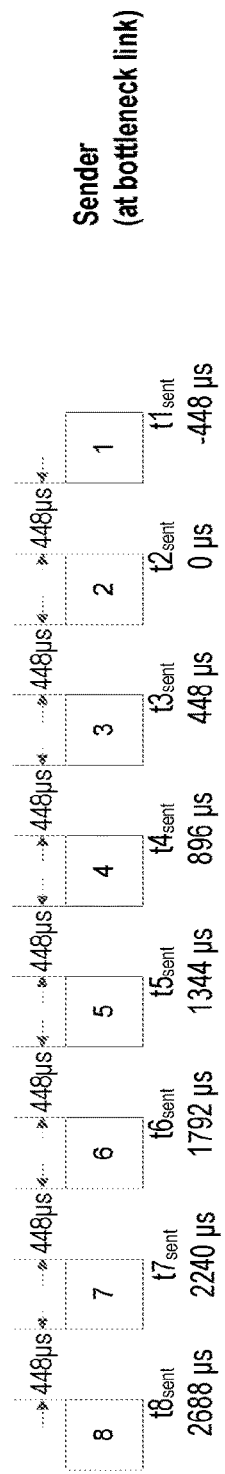

Take into account the sending times at the bottleneck link:

$t1_{delayed} = t1_{received} + 1$ interrupt latency (IL)
$t7_{delayed} = t7_{received} + 1$ interrupt latency (IL)
$t1_{received} = t2_{sent}$ Bottleneck bandwidth estimate, correcting for interrupt latency:

= (sum of packet sizes 2 through 7) / ($t7_{received} - t2_{sent}$)
= (sum of packet sizes 2 through 7) / (($t7_{received} - 1IL$) − ($t1_{delayed} - 1IL$))
= (6 * 1400 * 8 bits/byte) / ($t7_{delayed} - t1_{delayed}$)
= (6 * 1400 * 8 bits/byte) / (3188 μs − 500 μs)
= (67200 bits) / (3188 μs)
= 25 Mbps

FIG. 8D

Another source of bandwidth estimation error is the use of interrupt moderation techniques at the Rx.

In the following example, the NIC driver is modeled as firing an interrupt handler on a 1000μs periodic timer. Unlike the previous example, this handler has no delay in this model.

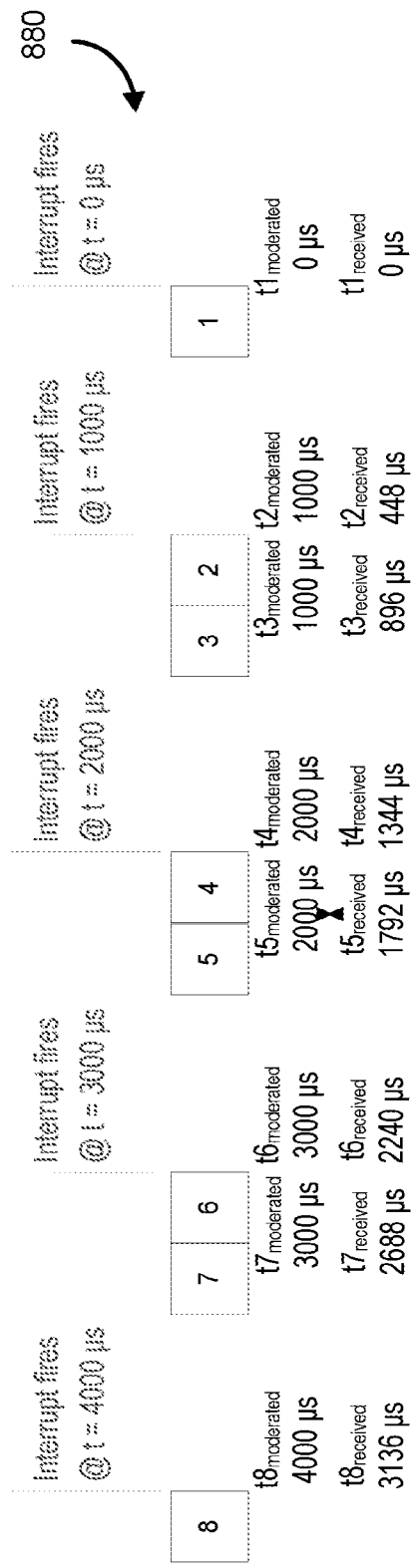

880

Interrupt moderation introduces an unknown error ($t_{moderated}$ minus $t_{received}$).
However, knowing the interrupt interval allows setting upper and lower bounds on the bandwidth estimate:

Upper bound - assume Packet 8 received just after the previous interrupt (t=3000 μs) completed execution:
= (sum of sizes of packets 2 through 8) / ($t7_{moderated}$ - $t1_{moderated}$)
= (7 packets * 1400 bytes/packet * 8 bits/byte) / (3000 μs - 0 μs)
= 26.1 Mbps Lower bound - assume Packet 8 received just before the last interrupt (t=4000 μs) started execution:
= (sum of sizes of packets 2 through 8) / ($t8_{moderated}$ - $t1_{moderated}$)
= (7 packets * 1400 bytes/packet * 8 bits/byte) / (4000 μs - 0 μs)
= 19.6 Mbps

FIG. 8E

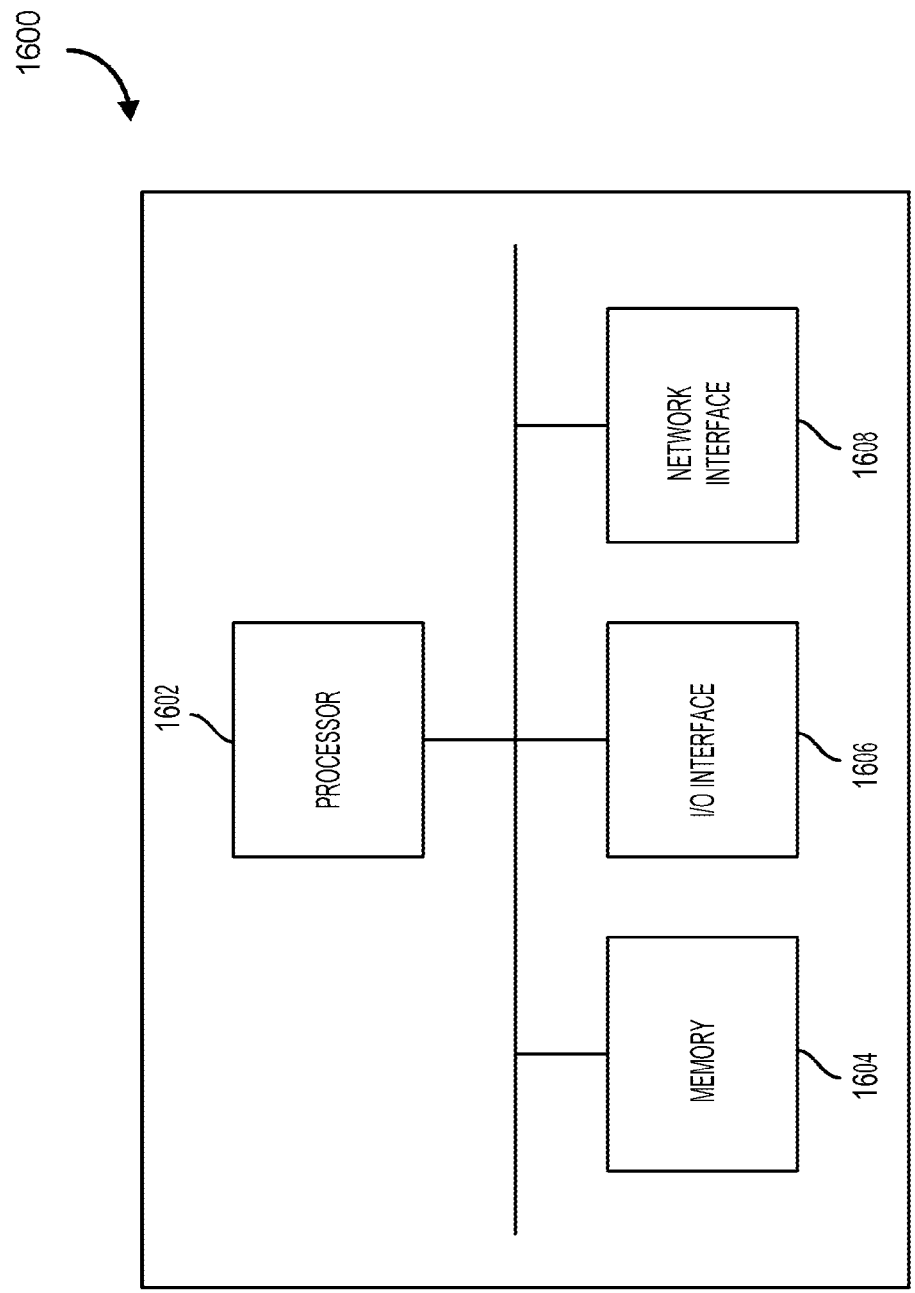

PACKET TRANSMISSION SYSTEM AND METHOD

CROSS-REFERENCE

This application is a Continuation of U.S. application Ser. No. 17/903,024 filed on Sep. 5, 2022, which is a Continuation of U.S. application Ser. No. 16/482,972 (now U.S. Pat. No. 11,438,265) filed on Aug. 1, 2019, which is a 371 US National Stage Application of PCT Application No. PCT/CA2017/051584 filed on Dec. 21, 2017, entitled "PACKET TRANSMISSION SYSTEM AND METHOD", which is a non-provisional of, and claims all benefit, including priority to: (1) U.S. Patent Application No. 62/437,635, filed 21 Dec. 2016, entitled "PACKET TRANSMISSION SYSTEM AND METHOD", and (2) U.S. Patent Application No. 62/558,610, filed 14 Sep. 2017, entitled "PACKET TRANSMISSION SYSTEM AND METHOD". Both of these applications are incorporated by reference in their entirety.

FIELD

The present disclosure generally relates to the field of electronic communications, and more specifically improved transmission of packets for protocols with competing requirements, such as latency, throughput, jitter, and packet sequence, and the bonding of multiple data connections to realize improved transmission speeds and improved reliability in situations where individual data connections may be lossy, unreliable or have significantly differing or varying latencies; transmission speeds; or packet loss.

INTRODUCTION

Transmission of electronic data over wired and wireless networks may be conducted using various types of packetized approaches. For example, packets may be provided under various protocols, such as user datagram protocol (UDP) and transmission control protocol (TCP). For UDP packets, the packets are provided on a "best effort" basis, meaning there are no acknowledgements regarding receipt of a packet sent per packet at the transport layer. Accordingly, efficient transmission at the transport layer is simplified, leaving the application to handle out-of-order or missing packets in a flexible manner. For TCP packets, error checking is conducted as part of the transport protocol, and TCP packet sequence numbers and acknowledgements are utilized to ensure the application receives all data reliably and in order. Missing packets, for example, are explicitly retransmitted.

With TCP, receiving mis-ordered packets may impact transmission efficiency due to acknowledgement and re-request processes built-in to TCP because the congestion control algorithm assumes that mis-ordered packets are caused by network transmission errors and transmission speed is reduced to compensate for these perceived errors. This problem is particularly important where data connections with significantly differing latencies are naively bonded, resulting in a significant transmission speed reduction (known as the "head of line blocking" problem).

SUMMARY

Bonding different networks and/or connections together is technically challenging. Singular networks and/or connections are especially vulnerable to transmission errors, signal loss, and a lack of redundancy. Bonded networks and/or connections are particularly useful in various scenarios, such as newsgathering and reporting, as these scenarios require reliable, high bandwidth transmissions across a variety of environments, where individually reliable connections may not be readily available (e.g., rural area, high altitude), or even if available, congested (e.g., sporting event) or impaired (e.g., following a natural disaster).

Applicants have developed improved data transmission management solutions that, in some embodiments, apply non-conventional approaches to harnessing technical features of network technology in establishing hybrid network connections. As described in further detail, TCP is particularly challenging for bonding as additional technical precautions and approaches are required to be taken to establish a feasible connection (e.g., to avoid the "head of line" blocking problem, as noted above). These improved hybrid connections can be used, for example, for transferring high-bandwidth video, audio, or other data. For example, in a disaster situation, the improved hybrid connections may be utilized for establishing emergency communications, providing on-the-ground reporting, enabling emergency telemedicine, among others.

Network gateways for controlling data flows across network connections are described herein, along with corresponding methods, devices, and computer readable media. The gateway may, in some embodiments, be a physical hardware device that includes components, including processors, interfaces, buses, power supplies, memory (ROM, RAM, flash), that are configured to receive and route data packets, in accordance with instruction sets representative of software and embedded firmware in the form of programmatic code or computer logic.

The network gateway may, in an example, be a specialized computing device specifically optimized for bonding TCP connections, as described in some examples herein. The network gateway, in an alternate example, may be implemented using processors and/or other computing hardware as part of a larger system. The network gateway may be a single device, or in some cases, may be multiple devices that operate in concert. A corresponding de-bonding server may be provided to reconstruct signals at a point of receipt.

In an embodiment, the network gateway for routing data flows across a plurality of network connections, the network gateway includes: a plurality of network interfaces for transmitting data over the plurality of network connections; and at least one processor configured for: monitoring time-variant network transmission characteristics of the plurality of network connections; parsing at least one packet of a data flow of is associated with packets to identify a data flow class for the data flow, wherein the data flow class defines at least one network interface requirement for the data flow; and routing packets in the data flow across the plurality of network connections based on the data flow class, and the time-variant network transmission characteristics In another embodiment, the network gateway includes a plurality of network interfaces for transmitting data over the plurality of network connections, the plurality of network interfaces including a first network interface. The network gateway includes a processor configured for transmitting a sequential burst of packets across the first network interface. The processor, based on timestamps recorded when packets in the sequential burst of packets are received at a receiving node, and the size of the packets, generates a bandwidth of the first network interface; and routes a data flow of sequential packets across the plurality of network connections based on the generated bandwidth of the first network interface.

In an aspect, generating the bandwidth of the first network interface includes generating the bandwidth based on the timestamps of packets in the burst which are not coalesced with an initial or a final packet in the burst.

In another aspect, generating the bandwidth of the first network interface includes: substituting a received timestamp for a particular packet in the burst with a sent timestamp of a packet sent after the particular packet.

In another aspect, when the receiving node processes received packets at periodic intervals, generating the bandwidth of the first network interface includes (i) generating a lower bandwidth value by using a received timestamp for a packet in the burst selected as an end packet in the bandwidth determination; and (ii) generating an upper bandwidth value by substituting the received timestamp for the packet in the burst selected as the end packet with a received timestamp of a packet in the burst preceding the end packet.

In another aspect, the processor is configured, for each packet of the sequential packets in the data flow, providing the packet for routing over one of the plurality of network connections based on monitored latencies of the plurality of network connections and the network connections of other packets in the data flow such that the packets in the data flow arrive at a destination node in a desired sequence.

In another aspect, the desired sequence is an original sequence of the sequential packets in the data flow.

In another aspect, the desired sequence is a sequence including at least one mis-ordering of packets which does not trigger re-transmission of a packet in the sequence.

In another aspect, the processor is configured for: receiving packets from a source interface for routing to a destination node via the plurality of network connections; transmitting acknowledgements to the source interface before routing the packets to the destination node; and storing the packets in at least one buffer before the packets are routed to the destination node.

In another aspect, the at least one processor is configured for dynamically controlling a size of the at least one buffer based on a bandwidth delay product associated with the plurality of network connections.

In another aspect, the at least one processor is configured for controlling the transmission of acknowledgements and storage of the packets based on monitored of transmission characteristics of the plurality of network connections, and an uneven distribution in the receipt of the data flow of sequential packets.

In another aspect, the at least one processor is configured to provide the packets based on at least one of: the bandwidth of the first data connection, and reducing a number of network connections over which the data flow is routed.

In another aspect, the at least one processor is configured to route packets for a plurality of data flows; and wherein the at least one processor is configured for: providing packets of the plurality of data flows for routing over one of the plurality of network connections based on a classification of the plurality of data flows.

In another aspect, a classification of one of the plurality of data flows changes after a threshold volume of data has been routed.

In accordance another aspect, there is provided a data transmission management device ("gateway") adapted for controlling routing of data packets belonging to a plurality of flows, across a plurality of simultaneous data connections, each data connection carrying a plurality of packets belonging to multiple flows, where at least one of the plurality of flows has data packets that are to be transmitted in a substantially sequential manner, the data transmission management device comprising: a buffer manager configured to receive a flow (sequence of input data packets) from one or more input data connections, the buffer manager storing the input data packets in one or more buffers to be extracted for routing, each input data packet being associated with a corresponding sequence number representing an order in the flow or sequence; a connection controller configured to interface with a plurality of data connections, each of the data connections having different transmission characteristics; and a scheduler configured to control the operation of the buffer manager by generating instructions that are executed by the buffer manager to control routing of the input data packets from the one or more buffers through the plurality of data connections, the routing determining, for each individual input data packet, (i) a corresponding data connection through which the individual input data packet will be transmitted, and (ii) a connection-specific timing or sequence in which the individual input data packet will be transmitted on the corresponding data connection.

In another aspect, the device further includes a network characteristic monitoring unit configured to monitor transmission characteristics across each of the plurality of data connections, monitored together or individually.

In another aspect, the device further includes an operations engine configured to control the operation of the scheduler by generating instructions that are executed by the scheduler to control routing of the input data packets stored at the one or more buffers, the routing controlled based on the monitored transmission characteristics across the plurality of data connections, the operations engine configured to modify the routing based on input data sets providing information on at least one of: throughput, packet loss, latency, explicit congestion notification (ECN) cost, reliability, jitter, user/administrative preference, and other network connection constraints.

In another aspect, the device further includes a sequencer configured to rearrange the input data packets received by the data transmission management device based on the sequence numbers of each of the input data packets.

In another aspect, the device further includes a flow identification engine, designed to identify flows based on specific characteristics and provide flow information to the operations engine and sequencer In another aspect, the device further includes a flow classification engine configured to classify input data flows and their requirements, and provide this information to the operations engine for modification of the routing of the input data flows, and to the sequencer for modification of how data packets are rearranged, based on the characteristics and requirements of the flow.

In another aspect, the buffer manager is further configured to provide overbuffering to account for variability of transmission characteristics of the plurality of data connections, and an uneven distribution of transmission ("bursty transmission").

In another aspect, the operations engine is further configured to determine a bandwidth delay product in relation to each data connection of the plurality of data connections, the bandwidth delay product being used to modify the routing as controlled by the scheduler.

In another aspect, the operations engine is further configured to perform bandwidth estimation where incomplete information is available.

In another aspect, the one or more types of data traffic (flows) include at least one of FTP, DNS, HTTP, SSH, and SSL/TLS.

In another aspect, the operations engine is configured to determine which of the one or more data flows are latency sensitive, and for the one or more data flows that are latency sensitive preferentially maintain routing of corresponding input data packets through data connections of the plurality of data connections that have a lower and/or similar latency characteristic. In this scenario, the operations engine may also prevent the routing of flows that are not latency sensitive through this plurality of data connections, in order to prevent overbuffering/buffer bloat.

In another aspect, the operations engine is further configured to modify the header information of known protocols in order to optimize their performance over the plurality of data connections. For example, if the plurality of data connections includes one or more high latency terrestrial satellite connections, the optimization engine might adjust the advertised TCP window size in order to allow the flow to take advantage of the high bandwidth delay product (known as TCP acceleration). These changes may further require the buffer manager to buffer additional packets on a per-flow basis. Another example is modification of the TCP MSS (maximum segment size) header option, to match the smallest MSS supported by the plurality of data connections, in order to prevent data packet fragmentation.

In another aspect, there is provided a data transmission management method for controlling routing of data flows (comprised of data packets) across a plurality of data connections to provide improved transmission performance where at least one of the plurality of data flows is to be transmitted in a substantially sequential manner, the data transmission management method comprising: receiving a stream or sequence of input data packets from one or more input data sources to be stored in one or more buffers to be extracted for routing, each input data packet being associated with a corresponding sequence number representing an order in the data flow or sequence; interfacing with a plurality of data connections, each of the data connections having different transmission characteristics; and generating routing instructions, by a scheduler, controlling the one or more buffers to route the input data packets over the plurality of data connections, the instructions providing, for each individual input data packet, (i) a corresponding data connection through which the individual input data packet will be transmitted, and (ii) a connection-specific timing or sequence in which the individual input data packet will be transmitted on the corresponding data connection; and routing the input data packets in accordance with the routing instructions.

In another aspect, there is provided a non-transitory computer readable medium storing instructions, which when executed, cause a process to perform steps of a data transmission management method for controlling routing of data flows (comprised of data packets) across a plurality of data connections to provide improved transmission performance where at least one of the plurality of data flows is to be transmitted in a substantially sequential manner, the method comprising: receiving a stream or sequence of input data packets from one or more input data sources to be stored in one or more buffers to be extracted for routing, each input data packet being associated with a corresponding sequence number representing an order in the data flow or sequence; interfacing with a plurality of data connections, each of the data connections having different transmission characteristics; and generating routing instructions, by a scheduler, controlling the one or more buffers to route the input data packets via the plurality of data connections, the instructions providing, for each individual input data packet, (i) a corresponding data connection through which the individual input data packet will be transmitted, and (ii) a connection-specific timing or sequence in which the individual input data packet will be transmitted on the corresponding data connection; and routing the input data packets in accordance with the routing instructions.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 8D illustrates a variant of the example described in FIG. 8C, correcting for errors due at least in part to interrupt latency under differing conditions, according to some embodiments.

FIG. 8E is a description of an example bandwidth estimation method illustrating an example where interrupt moderation techniques are taken into consideration, according to some embodiments

FIG. 16 is illustrative of a computing device, according to some embodiments.

DETAILED DESCRIPTION

Figure 1:
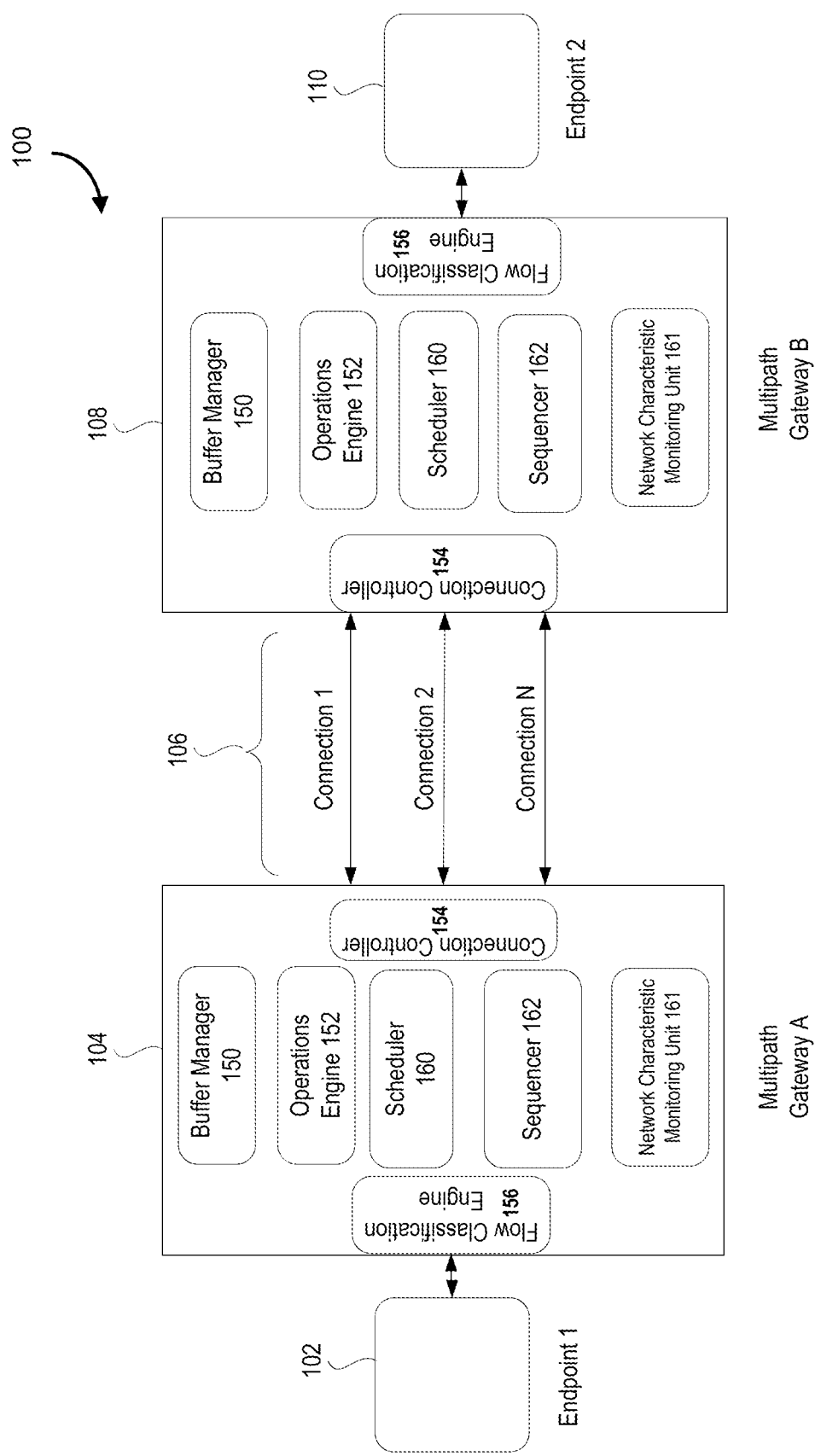
FIG. 1 is a block schematic of a system having two gateways, each containing a buffer manager, an operations engine, a connection controller, a network characteristic monitoring unit, a flow classification engine (handling flow identification and classification), a scheduler and a sequencer, and linked by N data connections, with each gateway connected to a particular endpoint, according to some embodiments.

Embodiments of methods, systems, and apparatus are described through reference to the drawings.

The transmission control protocol (TCP) utilizes a three-way handshake to establish a connection, and is thus a reliable protocol (as opposed to the user datagram protocol (UDP), which is a connectionless protocol). These protocols are described, for example, in RFC 793 and RFC 7323, which are incorporated herein by reference.

TCP requires more complex implementation, and is adapted for guaranteed, in-order delivery of packets. The connection must first be established between a transmitter and a recipient prior to data transfer, and this connection is often terminated at the end of data transmission (to release allocated resources).

The initial handshake to establish the connection provides an initial sequence number (e.g., an arbitrary sequence number) that will be used during data transmission to identify the order of data provided during data transmission.

During data transmission, data generated by the application is segmented into data packets and these data packets or segments have information (e.g., "headers") prepended as they are encapsulated for transmission. The headers contain information utilized during transmission that indicate, for example, the sequence number associated with each segment of data. The sequence number is utilized by a receiving device such that segments of data can be reordered and re-constructed despite segments of data being received out of order, lost (e.g., a retransmission may be requested), delayed, corrupted, etc.

TCP approaches utilize additional processes to help reduce issues with transmission, and these processes include flow control, error detection, re-transmission protocols, congestion control, selective acknowledgements, etc.

In some scenarios, improved data communications performance may be obtained through the use of multiple data connections or networks operating in concert. These data connections or networks may be considered to be "bonded" together such that the networks are logically joined, or coupled. Two or more networks, operating in concert, may perform one or more communications functions, such as transmitting data, providing error correction, among others. In this context, the one or more networks need not necessarily be separate networks, but may include different channels over a same network, different data connections, etc.

Bonded networks are desirable as there may be improved data transmission characteristics (such as increased reliability and increased speed) that may be obtained through advantageously utilizing the combined characteristics of each network or using divergent characteristics and capabilities. Networks, for example, may include cellular networks, Ethernet networks, WiFi, satellite networks, among others, with varying characteristics and quality.

For example, a particular network connection (e.g., path, channel) may be ideal for a specific type of communication (e.g., low latency but low bandwidth for error detection and control signals), and another network connection may be ideal for another type of communication (e.g., high bandwidth for high throughput data transfer). In some embodiments, the bonding of networks can be provided such that endpoints (e.g., transmitters, receivers) do not need to be aware of the communication paths or approaches utilized for the communication of data.

As TCP is a protocol in use for a significant number of networks and traffic, it may be particularly desirable to have a bonded TCP solution having improved transfer characteristics. However, bonded TCP solutions are difficult to implement.

A challenge with using TCP (as it requires acknowledgement of each packet, among others) is that TCP connections are technically difficult to "bond" together, particularly where the data connections are provided over networks that have significantly different characteristics, such as different latencies. These difficulties impact the efficiency of communication systems that utilize bonding for networked TCP communications.

Data is transmitted over a combination of the data connections (e.g., over different networks) to one or more endpoints, and the transmission of the data is facilitated such that the data can be recombined (e.g., by a "de-bonding" system) and the original data may be regenerated from the transmitted data.

Such "bonding" of connections and allocation of functions thereof is described, for example, in Applicant's U.S. Pat. No. 8,873,560, which is incorporated herein by reference.

As the bonding process typically requires segmentation of the data packets comprising a data flow to be transmitted over the bonded networks or data connections thereof, there are specific technical challenges that need to be overcome in the context of the use of bonding in relation to TCP.

Different types of traffic (e.g., voice data, control packets, video data, error control) are impacted differently by ordering requirements.

For systems implementing bonded networks for the transfer of data, technical considerations include, but are not limited to, ease of bonding/de-bonding (e.g., computational resources required as compared with computational resources available, and total computing time), transfer latency, packet loss, redundancy, security, maximum throughput, average throughput, and congestion management.

Simple round robin solutions using multiple networks or data connections typically provide a benefit only if the connections have identical or nearly identical characteristics (e.g. latency, capacity). If one connection has significantly higher latency, every other packet will be delayed, and potentially treated as lost or delayed by the sender and receiver, causing the sender to reduce its congestion window (cwnd), and as consequently reduce throughput.

If one connection has significantly higher capacity, once the lower capacity connection has reached its limit, every other packet sent on that connection will be lost.

As such, simple round robin solutions typically help with load balancing and redundancy, but this comes at the cost of throughput when the connections have different characteristics.

Multipath TCP (RFC6824) is a transport layer solution generally used to bond wireless networks, such as WiFi and cellular. As described below, the system of some embodiments may provide advantageous performance relative to other solutions such as Multipath TCP (MPTCP), because:

1) MPTCP requires both end points (Client (C) and Server (S)) to use and be able to process MPTCP. Since both end points know about the multiple paths, they run independent congestion control algorithms on each of them, and the end points do not encounter the issues described above with a standard TCP stack. In contrast, the disclosed system, in some embodiments, works when the endpoints are not configured to interoperate with MPTCP, or the multiple paths are not connected directly to the endpoints (i.e., the multiple paths are only known to intermediate hops between the endpoints).

2) MPTCP attempts to be fair when competing with other non-MPTCP flows over a congested link ("coupled congestion control"). Without explicit congestion notification (ECN), which is not widely deployed, the MPTCP system guesses whether any congestion it is seeing is on a link shared by all the subflows. It often guesses wrong, resulting in lower throughput than expected.

As illustrated in FIG. 1, a system 100 is illustrated that is configured to utilize an improved scheduling approach on the transmitting portion of the system and a buffering system on the receiving end with sequencing of packets. The components illustrated, in an embodiment, are hardware components that are configured for interoperation with one another. In another embodiment, the components are not discrete components and more than one of the components can be implemented on a particular hardware component (e.g., a computer chip that performs the function of two or more of the components).

In some embodiments, the components reside on the same platform (e.g., the same printed circuit board), and the system 100 is a singular device that can be transported, connected to a data center/field carry-able device (e.g., a rugged mobile transmitter), etc. In another embodiment, the components are decentralized and may not all be positioned in close proximity, but rather, communicate electronically through telecommunications (e.g., processing and control, rather than being performed locally, are conducted by components residing in a distributed resources environment (e.g., cloud).

Providing bonded connectivity is particularly desirable in mobile scenarios where signal quality, availability of networks, quality networks, etc. are sub-optimal (e.g., professional newsgathering/video creation may take place in locations without strong network infrastructure).

A number of different data connections 106 (e.g., "paths") representing one or more networks (or network channels) is shown, labelled as Connection 1, Connection 2. Connection N. There may be multiple data connections/paths across a single network, or multiple data connections that may use one or more networks.

The system 100 may be configured to communicate to various endpoints 102, 110 or applications, which do not need to have any information about the multiple paths/connections 106 used to request and receive data (e.g., the endpoints 102, 110 can function independently of the paths or connections 106). The received data, for example, can be re-constructed such that the original transmission can be regenerated from the contributions of the different paths/connections 106 (an example use scenario would be the regeneration of video by way of a receiver that is configured to slot into a server rack at a data center facility, integrating with existing broadcast infrastructure to provide improved networking capabilities).

The system 100 receives input (data flows) from a source endpoint 102 and schedules improved delivery of data packets across various connections 106, and then sequences the data packets at the other end of the system 108 prior to transmission to the destination endpoint application 110. In doing so, the system 100 is configured to increase bandwidth to approach the sum of the maximum bandwidth of the various paths available. Compared to using a single connection, the system 100 also provides improved reliability, which can be an important consideration in time-limited, highly sensitive scenarios, such as newsgathering at live events as the events are taking place. At these events, there may be high signal congestion (e.g., sporting event), or unreliability across one or more of the paths (e.g., reporting news after a natural disaster).

In various embodiments, both the scheduler and the sequencer could be provided from a cloud computing implementation, or at an endpoint (prior to the data being consumed by the application at the endpoint), or in various combinations thereof.

The system 100 may be tuned to optimize and or prioritize, performance, best latency, best throughput, least jitter (variation in the latency on a packet flow between two systems), cost of connection, combinations of connections for particular flows, among others (e.g., if the system 100 has information that a transmission (data flow) is of content type X, the system 100 may be configured to only use data connections with similar latency, whereas content type Y may allow a broader mix of data connections (or require greater net capacity which can only be accomplished with a combination of data connections)). This tuning may be provided to the system generally, or specific to each flow (or set of flows based on location, owner of either starting point or endpoint or combination thereof, time of transmission, set of communication links available, security needed for transmission etc.).

Figure 11:
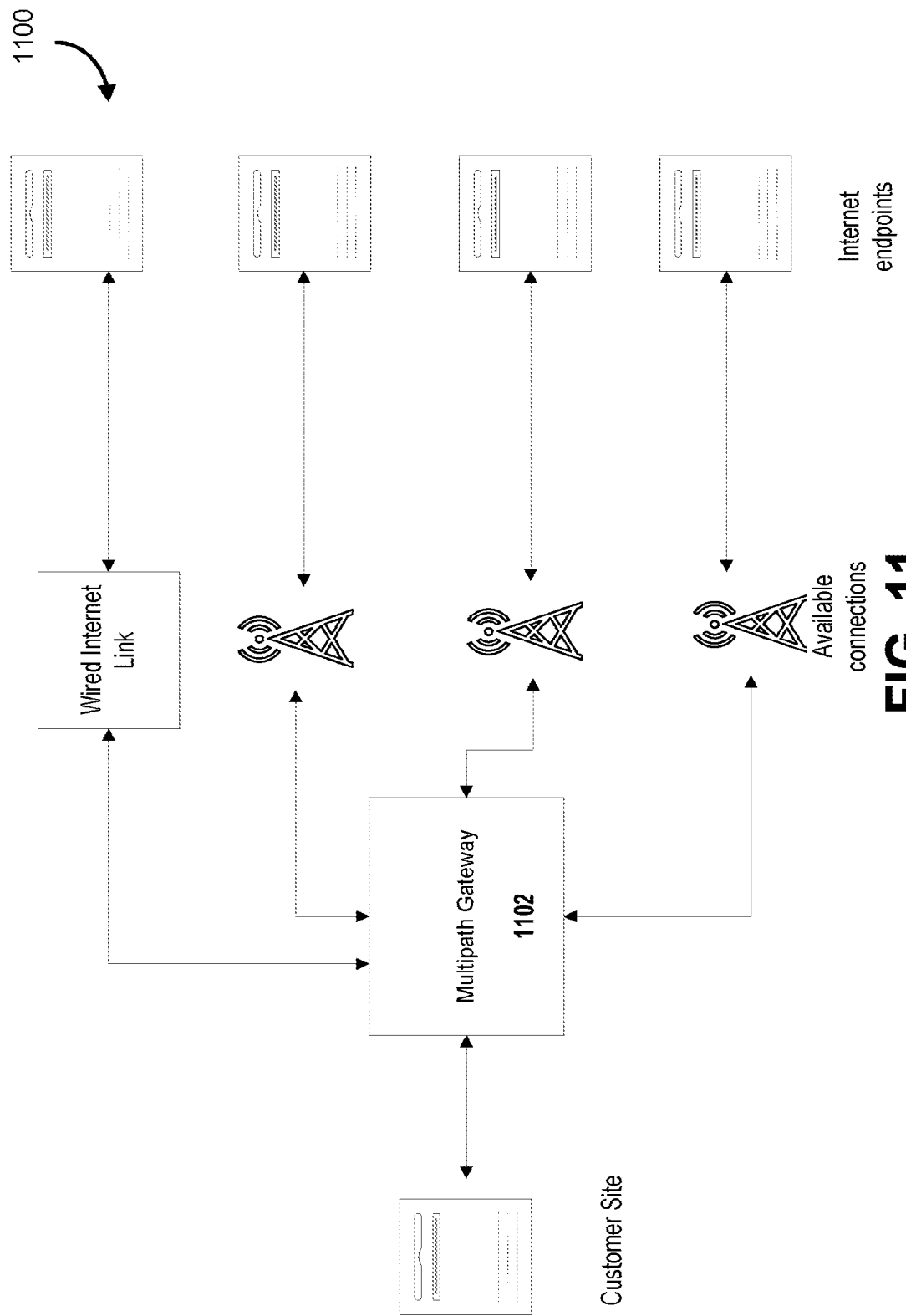
FIG. 11 is a block diagram depicting a scenario configured for an unbonded disaster recovery/load balancing application (each flow sticky to a particular data channel with no bonding whatsoever, as the buffer isn't needed on the other side, i.e. no second gateway), according to some embodiments.

The system 100 may be generally bidirectional, in that each gateway 104, 108, will generally have a scheduler and sequencer to handle the TCP traffic (or UDP traffic, or a combination of TCP and UDP traffic, or any type of general IP traffic), though in some embodiments, only one gateway may be required (for example, refer to FIG. 11 where simple disaster recovery as a service is depicted).

A feature of the scheduling portion of the system is a new approach for estimating the bandwidth of a given connection (for example, refer to FIG. 8).

Figure 9:
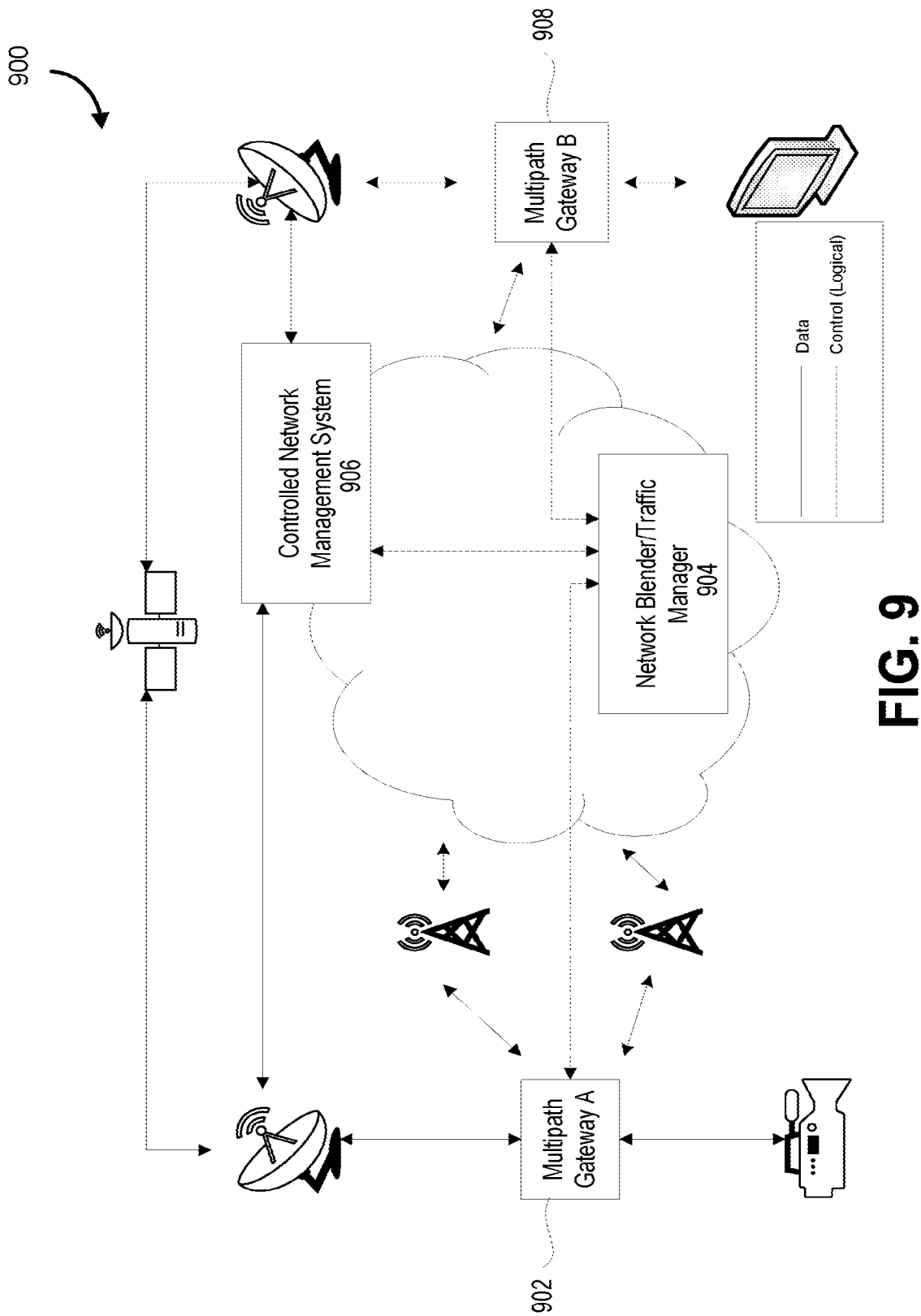
FIG. 9 is a block schematic depicting a system utilizing satellite offload (single input), according to some embodiments.
Figure 10:
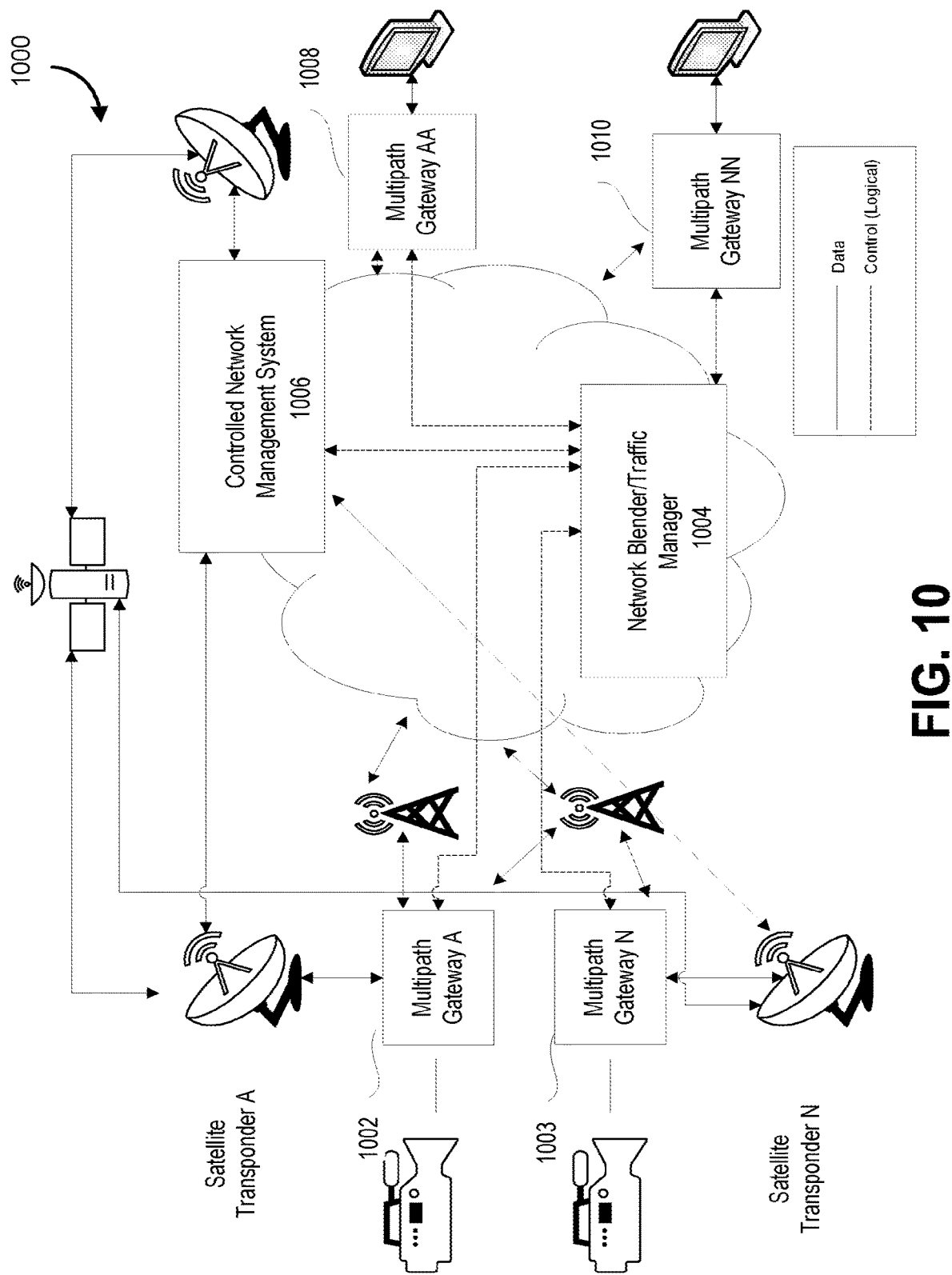
FIG. 10 is a block diagram depicting an example of blending with multiple inputs, according to some embodiments.
Figure 12:
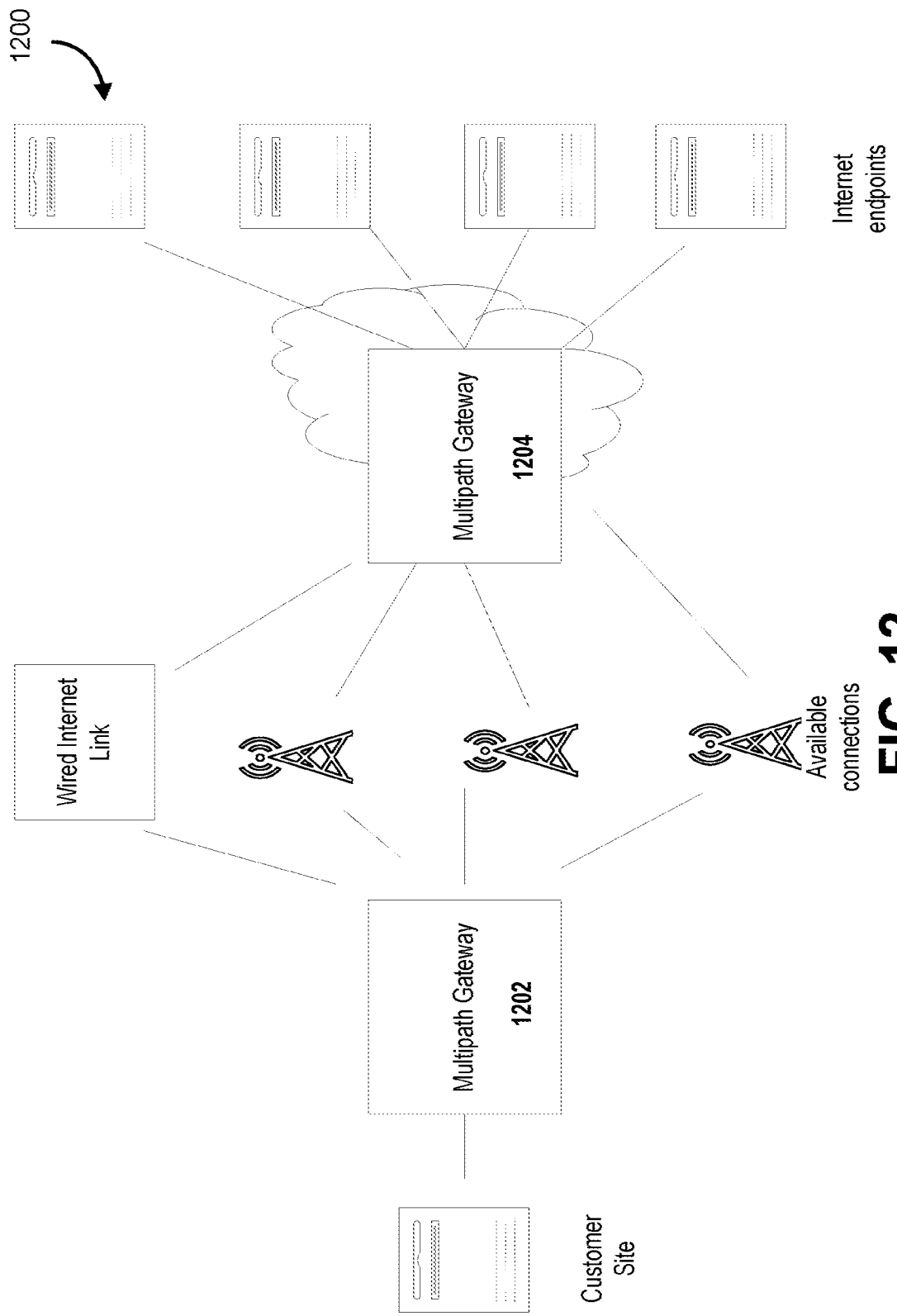
FIG. 12 is a block diagram depicting a system configured for bonded disaster recovery/load balancing applications, where traffic is bonded and routed through a second gateway, according to some embodiments.

The system 100 may be utilized for various scenarios, for example, as a failover or supplement for an existing Internet connection (e.g. a VoIP phone system, or corporate connection to web), whereby additional networks (or paths) are added either to seamlessly replace a dropped primary Internet connection, or bonding is used to only include costlier networks if the primary Internet connection is saturated (as illustrated at FIGS. 11 and 12). Another use is to provide a means of maximizing the usage of a high cost (often sunk cost), high reliability data connections such as satellite, by allowing for the offloading of traffic onto other data connections with different attributes (FIGS. 9 and 10).

In some embodiments, the system is a network gateway configured for routing data flows across a plurality of network connections.

FIG. 1 provides an overview of a system with two gateways 104 and 108, each containing a buffer manager 150, an operations engine 152, a connection controller 154, a flow classification engine 156 (responsible for flow identification and classification), a scheduler 158, a sequencer 160, and a network characteristic monitoring unit 161 and linked by N data connections 106, with each gateway connected to a particular endpoint 102,110. The reference letters A and B are used to distinguish between components of each of the two gateways 104 and 108.

Each gateway 104 and 108 is configured to include a plurality of network interfaces for transmitting data over the plurality of network connections and is a device (e.g., including configured hardware, software, or embedded firmware), including processors configured for: monitoring time-variant network transmission characteristics of the plurality of network connections; parsing at least one packet of a data flow of packets to identify a data flow class for the data flow, wherein the data flow class defines or is otherwise associated with at least one network interface requirement for the data flow; and routing packets in the data flow across the plurality of network connections based on the data flow class, and the time-variant network transmission characteristics.

The buffer manager 150 is configured to set buffers within the gateway that are adapted to more efficiently manage traffic (both individual flows and the combination of multiple simultaneous flows going through the system). In some embodiments, the buffer manager is a discrete processor. In other embodiments, the buffer manager is a computing unit provided by way of a processor that is configured to perform buffer management 150 among other activities.

The operations engine 152 is configured to apply one or more deterministic methods and/or logical operations based on received input data sets (e.g., feedback information, network congestion information, transmission characteristics) to inform the system about constraints that are to be applied to the bonded connection, either per user/client, destination/server, connection (e.g., latency, throughput, cost, jitter, reliability), flow type/requirements (e.g., FTP vs. HTTP vs. streaming video). For instance, the operations engine 152 may be configured to limit certain types of flows to a particular connection or set of data connections based on cost in one instance, but for a different user or flow type, reliability and low latency may be more important. Different conditions, triggers, methods may be utilized depending, for example, on one or more elements of known information. The operations engine 152, for example, may be provided on a same or different processor than buffer manager 150.

The operations engine 152 may be configured to generate, apply, or otherwise manipulate or use one or more rule sets determining logical operations through which routing over the N data connections 106 is controlled.

The flow classification engine 156 is configured to evaluate each data flow received by the multipath gateway 104 for transmission, and is configured to apply a flow classification approach to determine the type of traffic being sent and its requirements, if not already known. In some embodiments, deep packet inspection techniques are adapted to perform the determination. In another embodiment, the evaluation is based on heuristic methods or data flows that have been marked or labelled when generated. In another embodiment, the evaluation is based on rules provided by the user/administrator of the system. In another embodiment, a combination of methods is used. The flow classification engine 156 is configured to interoperate with one or more network interfaces, and may be implemented using electronic circuits or processors.

Flow identification, for example, can be conducted through an analysis of information provided in the packets of a data flow, inspecting packet header information (e.g., source/destination IP, transport protocol, transport protocol port number, DSCP flags, etc.).

Differentiated levels of identification may occur, as provided in some embodiments. For example, the contents of the packet body may be further inspected using, for example, deep packet Inspection techniques.

Once a flow has been identified, classification may include categorizing the flow based on its requirements. Example classifications include:

1. Low latency, low-to-medium jitter, packets can be out of order, high bandwidth (live HD video broadcast);
2. Low latency, low-to-medium jitter, packets can be out of order, medium bandwidth (Skype™, FaceTime™), among others (jitter is problematic in real-time communications as it can cause artifacts or degradation of communications);
3. Low latency, low-to-medium jitter, packets can be out of order, low bandwidth (DNS, VoIP);
4. Low latency, no jitter requirement, packets preferred to be in order, low bandwidth (interactive SSH)
5. No latency requirement, no jitter requirement, packets preferred to be in order, medium-to-high bandwidth (e.g., SCP, SFTP, FTP, HTTP); and
6. No latency requirement, no jitter requirement, packets preferred to be in order, no bandwidth requirement, sustained bulk data transfer (e.g., file/system backups), etc.

One or more dimensions over which classification can be conducted on include, but are not limited to:
  a. Latency;
  b. Bandwidth/throughput;
  c. Jitter;
  d. Packet ordering; and
  e. Volume of data transfer.

As described further below, these classification dimensions are useful in improving efficient communication flow. Latency and bandwidth/throughput considerations are particularly important when there are flows with conflicting requirements. Example embodiments where jitter is handled are described further below, and the system may be configured to accommodate jitter through, for example, buffering at the Scheduler, or keeping flows sticky to a particular connection. Packet ordering is described further below, with examples specifically for TCP, and the volume of data is related to where the volume of data can be used as an indicator that can reclassify a flow from one type (low latency, low bandwidth) to another type (latency insensitive, high bandwidth).

Other classification dimensions and classifications are possible, and the above are provided as example classifications. Different dimensions or classifications may be made, and/or combinations therein of the above. For example, in a media broadcast, the system may be configured to classify the video data and metadata associated with the clip (e.g., GPS info, timing info, labels), or the FEC data related to the video stream.

Flow classification can be utilized to remove and/or filter out transmissions that the system is configured to prevent from occurring (e.g., peer-to-peer file sharing in some instances, or material that is known to be under copyright), or traffic that the system may be configured to prefer (e.g., a particular user or software program over another) in the context of providing a tiered service).

For instance, in an Internet backup usage scenario, even the bonded backup may be limited in availability, so the system may be configured such that VoIP calls to/from the support organization receive a higher level of service than calls within the organization (where the system could, when under constraint, generate instructions that cause an endpoint to lower the audio quality of some calls over others, or to drop certain calls altogether given the bandwidth constraint).

The scheduler 160 is configured to perform a determination regarding which packets should be sent down which connections 106. The scheduler 160 may be considered as an improved QoS engine. The scheduler 160, in some embodiments, is implemented using one or more processors, or a standalone chip or configured circuit, such as a comparator circuit or an FPGA. The scheduler 160 may include a series of logical gates confirmed for performing the determinations.

While a typical QoS engine manages a single connection—it may be configured to perform flow identification and classification, and the end result is that the QoS engine reorders packets before they are sent out on the one connection.

In contrast, while the scheduler 160 is configured to perform flow identification, classification, and packet reordering, the scheduler 160 of some embodiments is further configured to perform a determination as to which connection to send the packet on in order to give the data flow improved transmission characteristics, and/or meet policies set for the flow by the user/administrator (or set out in various rules). The scheduler 160 may, for example, modify network interface operating characteristics by transmitting sets of control signals to the network interfaces to switch them on or off, or to indicate which should be used to route data. The control signals may be instruction sets indicative of specific characteristics of the desired routing, such as packet timing, reservations of the network interface for particular types of traffic, etc.

For example, 2 connections with the following characteristics are considered:
1) Connection 1: 1 ms round trip time (RTT), 0.5 Mbps estimated bandwidth; and
2) Connection 2: 30 ms RTT, 10 Mbps estimated bandwidth.

The scheduler 160 could try to reserve Connection 1 exclusively for DNS traffic (small packets, low latency). In this example, there may be so much DNS traffic that Connection 1's capacity is reached—the scheduler 160 could be configured to overflow the traffic to Connection 2, but the scheduler 160 could do so selectively based on other determinations or factors. e.g., if scheduler 160 is configured to provide a fair determination, the scheduler 160 could be configured to first overflow traffic from IP addresses that have already sent a significant amount of DNS traffic in the past X seconds.

The scheduler 160 may be configured to process the determinations based, for example, on processes or methods that operate in conjunction with one or more processors or a similar implementation in hardware (e.g., an FPGA). These devices may be configured for operation under control of the operations engine 152, disassembling data streams into data packets and then routing the data packets into buffers (managed by the buffer manager) that feed data packets to the data connections according to rules that seek to optimize packet delivery while taking into account the characteristics of the data connections.

While the primary criteria, in some embodiments, is based on latency and bandwidth, in some embodiments, path maximum transmission unit (PMTU) may also be utilized. For example, If one connection has a PMTU that is significantly smaller than the others (e.g. 500 bytes versus 1500), then it would be designated as a bad candidate for overflow since the packets sent on that connection would need to be fragmented (and may, for example, be avoided or deprioritized).

The scheduler 160, in some embodiments, need not be configured to communicate packets across in the correct order, and rather is configured for communicating the packets across the diverse connections to meet or exceed the desired QoS/QoE metrics (some of which may be defined by a network controller, others which may be defined by a user/customer). Where packets may be communicated out of order, the sequencer 162 and a buffer manager may be utilized to reorder received packets.

A sequential burst of packets is transmitted across a network interface, and based on timestamps recorded when packets in the sequential burst of packets are received at a receiving node, and the size of the packets, a bandwidth estimate of the first network interface is generated. The estimate is then utilized for routing packets in the data flow of sequential packets across a set of network connections based on the generated bandwidth of the first network interface. As described below, in some embodiments, the bandwidth estimate is generated based on the timestamps of packets in the burst which are not coalesced with an initial or a final packet in the burst, and a lower bandwidth value can be estimated and an upper bandwidth value can be estimated (e.g., through substitutions of packets). The packets sent can be test packets, test packets "piggybacking" on data packets, or hybrid packets. Where data packets are used for "piggybacking", some embodiments include flagging such data packets for increased redundancy (e.g., to reinforce a tolerance for lost packets, especially for packets used for bandwidth test purposes).

The sequential packets may be received in order, or within an acceptable deviation from the order such that sequencer 162 is capable of re-arranging the packets for consumption. In some embodiments, sequencer 162 is a physical hardware device that may be incorporated into a broadcasting infrastructure that receives signals and generates an output signal that is a reassembled signal. For example, the physical hardware device may be a rack-mounted appliance that acts as a first stage for signal receipt and re-assembly.

The sequencer 162 is configured to order the received packets and to transmit them to the application at the endpoint in an acceptable order, so as to reduce unnecessary packet re-requests or other error correction for the flow. The order, in some embodiments, is in accordance with the original order. In other embodiments, the order is within an acceptable margin of order such that the sequencer 162 is still able to reassemble the data flows. The sequencer 162 may include, for example, a buffer or other mechanism for smoothening out the received flow, and in some embodiments, is configured to control the transmission of acknowledgements and storage of the packets based on monitored of transmission characteristics of the plurality of network connections, and an uneven distribution in the receipt of the data flow of sequential packets.

The sequencer 162 may be provided, for example, on a processor or implemented in hardware (e.g., a field-programmable gate array) that is provided for under control of the operations engine 152, configured to reassemble data flows from received data packets extracted from buffers.

The sequencer 162, on a per-flow basis, is configured to hide differences in latency between the plurality of connections that would be unacceptable to each flow.

The Operations Engine 152 is operable as the aggregator of information provided by the other components (including 154), and directs the sequencer 162 through one or more control signals indicative of how the sequencer 162 should operate on a given flow.

When a system configured for a protocol such as TCP receives packets, the system is generally configured to expect (but does not require) the packets to arrive in order. However, the system is configured to establish a time bound on when it expects out of order packets to arrive (usually some multiple of the round trip time or RTT). The system may also be configured to retransmit missing packets sooner than the time bound based on heuristics (e.g. fast retransmit triggered by three DUP ACKs).

Where packets are arriving at the sequencer 162 on connections with significantly different latencies, the sequencer 162 (on a per flow basis), may be configured to buffer the packets until they are roughly the same age (delay) before sending the packets onward to the destination. For example, it would do this if the flow has requirements for consistent latency and low jitter.

The sequencer 162, does not necessarily need to provide reliable, strictly in-order delivery of data packets, and in some embodiments, is configured to provide what is necessary so that the system using the protocol (e.g., TCP or the application on top of UDP) does not prematurely determine that the packet has been lost by the network.

In some embodiments, the sequencer 162 is configured to monitor (based on data maintained by the operations engine 152) the latency variation (jitter) of each data connection, along with the packet loss, to predict, based on connection reliability, which data connections are likely to delay packets beyond what is expected by the flow (meaning that the endpoints 102 and 110 would consider them lost and invoke their error correction routines).

For an out of order situation, the sequencer 162 may, for example, utilize larger jitter buffers on connections that exhibit larger latency variations. For packet re-transmission, the sequencer 162 may be configured to request lost packets immediately over the "best" (most reliable, lowest latency) connection.

In an example scenario, the bandwidth delay product estimation may not be entirely accurate and a latency spike is experienced at a connection. As a result, packets are received out of order at an intermediary gateway.

In these embodiments, the sequencer 162 may be configured to perform predictive determinations regarding how the protocol (and/or related applications) might behave with respect to mis-ordered packets, and generate instructions reordering packets such that a downstream system is less likely to incorrectly assume that the network has reached capacity (and thus pull back on its transmission rate), and/or unnecessarily request retransmission of packets that have not been lost.

For example, many TCP implementations use three consecutive duplicate acknowledgements (DUP ACKs) as a hint that the packet subsequent to the DUP ACK is likely lost. In this example, if a receiver receives packets 1, 2, 4, 5, 6, it will send ACK (2) three times (once for each of packets 4/5/6). The sender then is configured to recognize that this event may hint that packet 3 is likely lost in the network, and pre-emptively retransmits it before any normal retransmission time-out (RTO) timers expire.

In some embodiments, the sequencer 162, may be configured to account for such predictive determinations. As per the above example, if the sequencer 162 has packets 1, 2, 4, 5, 6, 3 buffered, the sequencer 162 may then reorder the packets to ensure that the packets are transmitted in their proper order. However, if the packets were already buffered in the order of 1, 2, 4, 3, 5, 6, the sequencer 162 might be configured not to bother reordering them before transmission as the predictive determination would not be triggered in this example (given the positioning of packet 3).

The connection controller 154 is configured to perform the actual routing between the different connection paths 106, and is provided, for example, to indicate that the connections 106 to the bonded links need not reside on the physical gateway 104, 108 (e.g., a physical gateway may have some link (Ethernet or otherwise) to physical transmitting/receiving devices or satellite equipment that may be elsewhere (and may be in different places re: antennae and the like)). Accordingly, the endpoints are logically connected, and can be physically separated in a variety of ways.

In an embodiment, the system 100 is configured to provide what is known as TCP acceleration, wherein the gateway creates a prebuffer upon receiving a packet, and will provide an acknowledgment signal (e.g., ACK flag) to the sending endpoint as though the receiving endpoint had already received the packet, allowing the sending endpoint 102 to send more packets into the system 100 prior to the actual packet being delivered to the endpoint. In some embodiments, prebuffering is used for TCP acceleration (opportunistic acknowledging (ACKing), combined with buffering the resulting data).

This prebuffer could exist prior to the first link to the sending endpoint 102, or anywhere else in the chain to the endpoint 110. The size of this prebuffer may vary, depending on feedback from the multipath network, which, in some embodiments, is an estimate or measurement of the bandwidth delay product, or based on a set of predetermined logical operations (wherein certain applications or users receive pre-buffers with certain characteristics of speed, latency, throughput, etc.).

The prebuffer may, for example, exist at various points within an implementation, for example, the prebuffer could exist at the entry point to the gateway 104, or anywhere down the line to 110 (though prior to the final destination). In an embodiment, there are a series of prebuffers, for example, a prebuffer on both Gateway A and Gateway B as data flows from Endpoint 1 to Endpoint 2.

Data accepted into a prebuffer and opportunistically ACKed to endpoint 102 becomes the responsibility of the system 100 to reliably transmit to endpoint 110. The ACK tells the original endpoint 102 that the endpoint 110 has received the data, so it no longer needs to handle retransmission through its normal TCP mechanisms.

Prebuffering and opportunistic ACKing are advantageous because it removes the time limit that system 100 has available to handle loss and other non-ideal behaviours of the connections 106. The time limit without TCP acceleration is based on the TCP RTO calculated by endpoint 102, which is a value not in the control of the system 100. If this time limit is exceeded, endpoint 102: a) Retransmits data that system 100 may already be buffering; and b) Reduces its cwnd, thus reducing throughput.

Sizes of prebuffers may need to be limited in order to place a bound on memory usage, necessitating communication of flow control information between multipath gateways 104 and 108. For example, if the communication link between gateway 108 and endpoint 110 has lower throughput than the aggregate throughput of all connections 106, the amount of data buffered at 108 will continually increase. If the amount buffered exceeds the limit, a flow control message is sent to 104, to tell it to temporarily stop opportunistically ACKing data sent from endpoint 102. When the amount buffered eventually drops below the limit, a flow control message is sent to 104 to tell it to resume opportunistically ACKing. Limits may be static thresholds, or for example, calculated dynamically taking into account factors such as the aggregate BDP of all connections 106, and the total number of data flows currently being handled by the system. Thresholds at which the flow control start/stop messages are sent do not have to be the same (e.g. there can be hysteresis).

Similarly, there may be flow control signalling information within a multipath gateway itself. For example, if the aggregate throughput of connections 106 is smaller than the throughput between endpoint 102 and gateway 104, the prebuffers inside 104 will continually increase. After exceeding the limits (which may be calculated as previously described), opportunistic ACKing of data coming from endpoint 102 may need to be temporarily stopped, then resumed when the amount of data drops below the appropriate threshold.

The previous examples describe TCP acceleration for data being sent from endpoint 102 to 110. The same descriptions apply for data being sent in the opposite direction.

In another embodiment, a buffer manager is configured to provide overbuffering on the outgoing transmission per communication link to account for variability in the behaviour of the connection networks and for potentially "bursty" nature of other activity on the network, and of the source transmission.

Overbuffering may be directed to, for example, intentionally accepting more packets on the input side than the BDP of the connections on the output side are able to handle. A difference between "overbuffering" and "buffering" is that the buffer manager may buffer different amounts based on flow requirements, and based on how the connection BDP changes in real time.

This overbuffering would cause the gateway 104 accept and buffer more data from the transmitting endpoint 102 than it would otherwise be prepared to accommodate (e.g., more than it is "comfortable with"). Overbuffering could be conducted either overall (e.g., the system is configured to take more than the system estimates is available in aggregate throughput), or could be moved into the connection controller and managed per connection, or provided in a combination of both (e.g., multiple over-buffers per transmission).

For example, even though the system 100 might only estimate that it can send 20 Mbps across a given set of links, it may accept more than that (say 30 Mbps) from the transmitting endpoint 102 for a time, buffering what it can't immediately send, based on a determination that the network conditions may change possibly based on statistical, historical knowledge of the network characteristics provided by the network characteristic monitoring unit 161, or that there may be a time when the transmitting endpoint 102 (or other incoming or outgoing transmissions) may slow down its data transmission rate.

The flow classification engine 156, in some embodiments, is configured to flag certain types of traffic and the operations engine 152 may, in some embodiments, be configured to instruct the buffer manager to size and manage pre and/or over buffering on a per flow basis, selecting the sizes of the buffers based on any number of criteria (data type, user, historical data on behaviour, requirements of the flow).

In some embodiments, the size of these buffers are determined per transmission, and also per gateway (since there may be many transmissions being routed through the gateway at one time). In one embodiment, the prebuffering and overbuffering techniques are utilized in tandem.

In some embodiments, the size of overbuffering is determined to be substantially proportional to the bandwidth delay product (BDP). For example, the system may be configured such that if the network has a high BDP (e.g. 10 Mbps @400 ms=>500 KB), the buffer should be larger so that there is always have enough data available to keep the network/pipeline filled with packets. Conversely, with low BDP networks, the system may be configured such that there is less buffering, so as to not introduce excessive buffer bloat.

Buffer bloat may refer, for example, to excess buffering inside a network, resulting in high latency and reduced throughput. Given the advent of cheaper and more readily available memory, many devices now utilize excessive buffers, without consideration to the impact of such buffers. Buffer bloat is described in more details in papers published by the Association for Computing Machinery, including, for example, a Dec. 7, 2011 paper entitled: "BufferBloat: What's Wrong with the Internet?", and a Nov. 29, 2011 paper entitled: "Bufferbloat: Dark Buffers in the Internet", both incorporated herein by reference.

As an example of determining overbuffering size in relation to bitrate and latency, a rule may be implemented in relation to a requirement that the system should not add more than 50% to the base latency of the network due to overbuffering. In this example, the rule indicating that overbuffering size would be Bitrate*BaseLatency*1.5.

In one embodiment, the operations engine 152 may be contained in the multipath gateway 104, 108. In another embodiment, the operations engine 152 may reside in the cloud and apply to one or more gateways 104, 108. In one embodiment, there may be multiple endpoints 102, 110 connecting to a single multipath gateway 104, 108. In an embodiment, the endpoint 102, 110 and multipath gateway 104, 108 may be present on the same device.

In an embodiment, the connection controller 154 may be distinct from the multipath gateway 104, 108 (and physically associated with one or more connection devices (e.g. a wireless interface, or a wired connection)). In another embodiment, the connection controller may reside on the gateway, but the physical connections (e.g. interface or wired connection) may reside on a separate unit, device, or devices.

While the endpoints need to be logically connected, they may be connected such that they are connection 106 agnostic (e.g., communications handled by the multipath gateways 104, 108). In some embodiments, the set of connections 106 available to a given gateway could be dynamic (e.g. a particular network only available at certain times, or to certain users).

In one embodiment, the traffic coming from the endpoint 102 may be controllable by the system 100 (e.g., the system may be configured to alter the bitrate of a video transmission originating at the endpoint) based on dynamic feedback from the system 100. In another embodiment, the traffic coming from the endpoint 102 may not be controllable by the system 100 (e.g., a web request originating from the endpoint).

Figure 13:
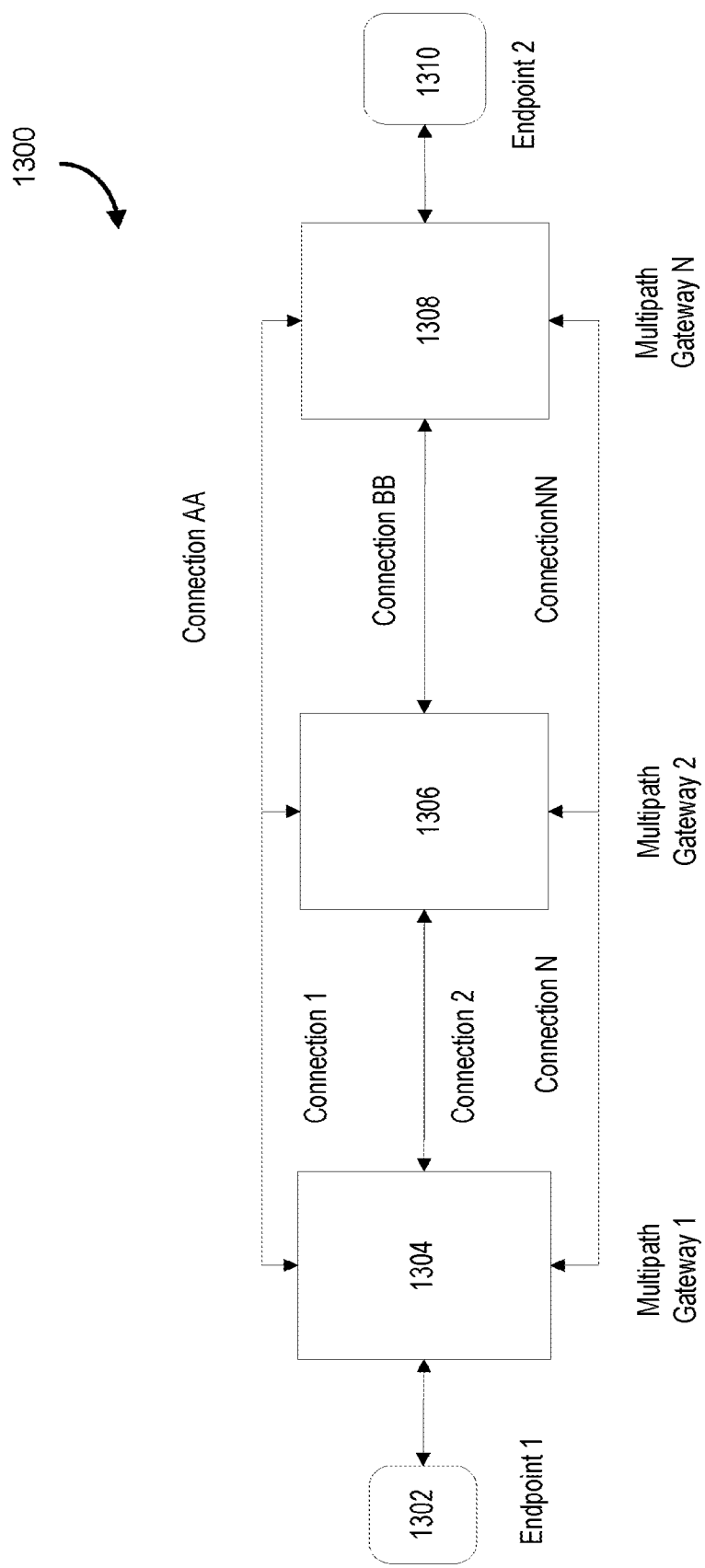
FIG. 13 shows a series of multipath gateways connecting two or more endpoints, according to some embodiments.

In another embodiment, there may be more than one set of multipath gateways 104, 108, in a transmission chain (for example, FIG. 13). For example, there may be, in some implementations, a TCP transmission with a remote multipath gateway connecting to a gateway in the cloud, with the transmission then providing a non-multipath connection to another multipath gateway on the edge of the cloud, with a transmission then to another multipath remote gateway.

Various use cases may be possible, including military use cases, where a remote field operator may have a need to transmit a large volume of data to another remote location. The operator's system 100 may be set up with a transmission mechanism where multiple paths are utilized to provide the data to the broader Internet. The system 100 would then use a high capacity backhaul to transmit to somewhere else on the edge of the Internet, where it then requires another multipath transmission in order to get to the second remote endpoint.

In an embodiment, Gateway A 104 and B 108 may be configured to send control information between each other via one of the connection paths available.

Figure 2:
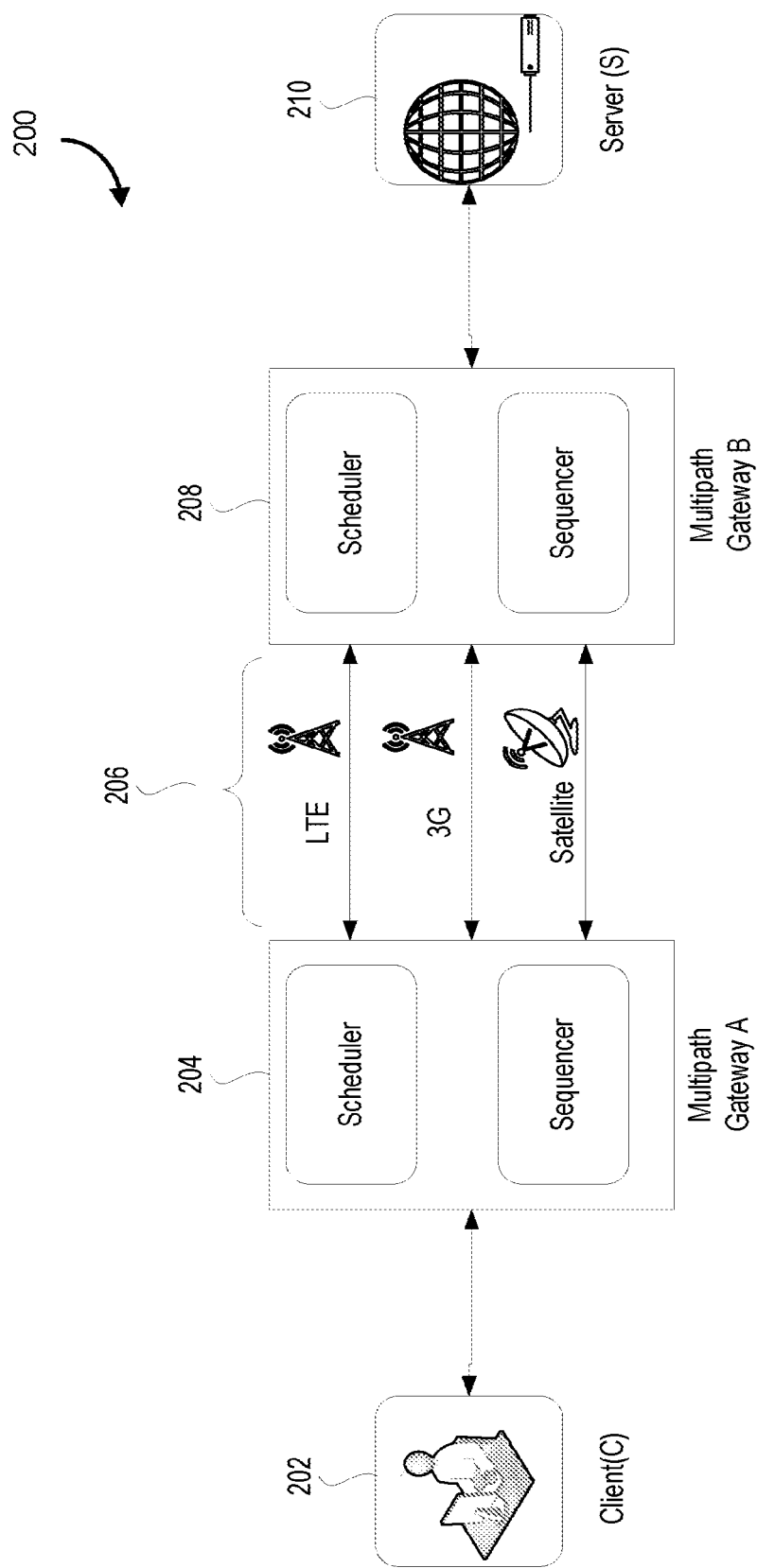
FIG. 2 is a block schematic depicting a scenario in which an Internet user connects to the web through a combination of gateways which make use of transport links with varying network characteristics, according to some embodiments.

FIG. 2 describes a scenario in which an Internet user connects to the web through a combination of gateways which make use of transport links with varying network characteristics.

While FIG. 2 is related to FIG. 1, examples of different interactions between a client 202 and server 204 are depicted. While the system may ultimately be a two-way system, there may be situations where transmission may be of a single way or primarily in a single direction (e.g., requests for data from webpages that serve data).

Devices that may be clients 202 may, for example, be various devices capable of communications, such as Internet of Things (IoT) devices. The other endpoints may be servers, such as IoT hubs. Connections 206 illustrated, for example, could include LTE networks, 3G networks, satellite connections, etc. Other connection types may include wired networks, WiFi networks (e.g., 802.11 specification), Bluetooth™, microwave connections, optical connections, other radio connections, among others. The reliability and connectivity of each of these networks and/or connections may be impacted by a variety of factors, such as multipath fading, interference, noise, etc.

Bandwidth, latency, jitter, packet loss, etc., may be impacted, and in some embodiments, endpoints 202, 210, and/or multipath gateways 204, 208 may be moving, and even the number and type of available connections 206 may be dynamically available and unavailable. For example, a telecommunications-equipped van may drive in and out of cellular coverage zones, satellite coverage, etc.

Figure 3:
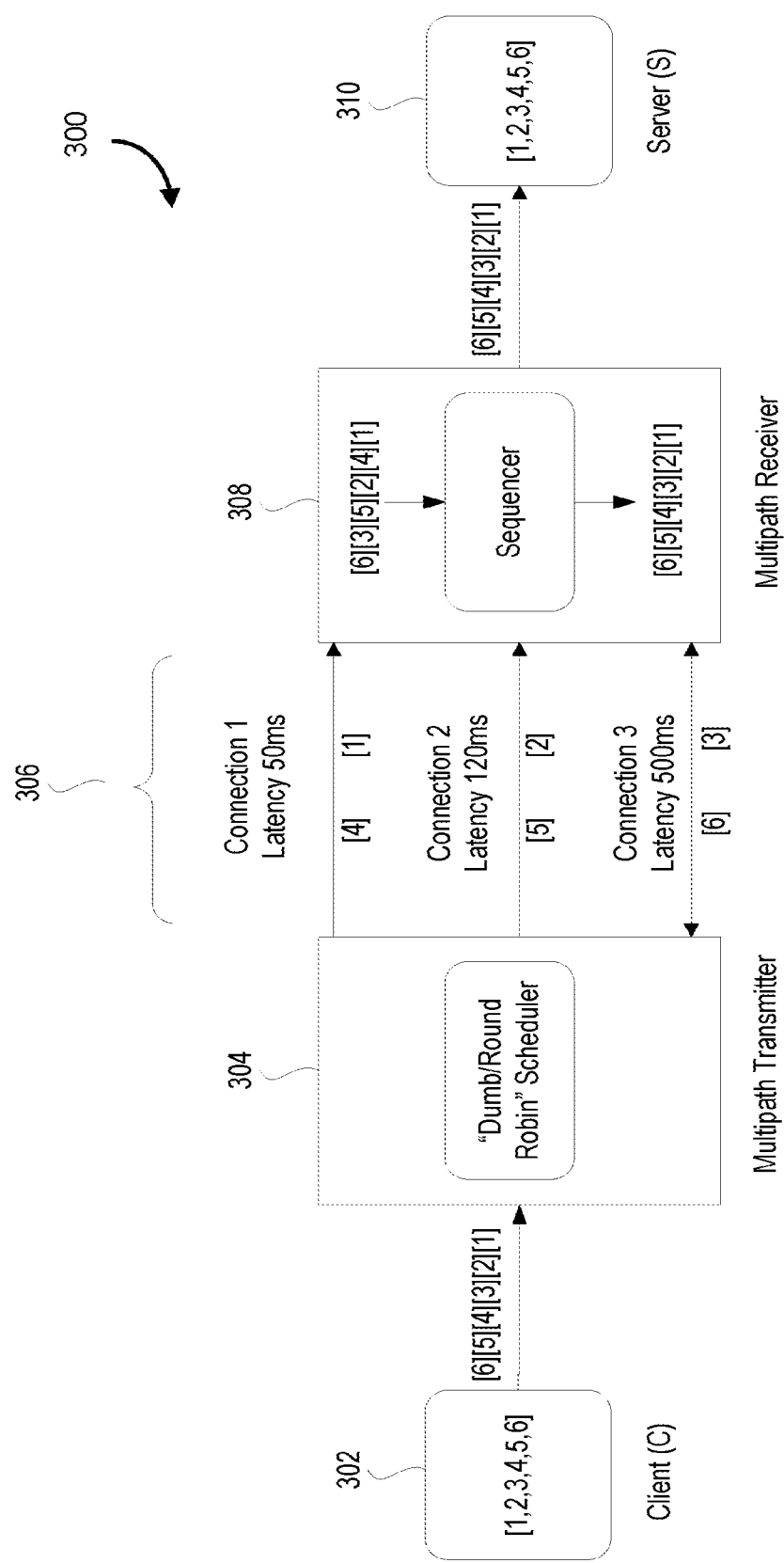
FIG. 3 is a block schematic illustrative of the operations of the sequencer, by demonstrating the sequencing of 6 packets according to an example derived from the networks of FIG. 2, according to some embodiments.

FIG. 3 is provided to depict a more detailed example of methods performed by the sequencer 160, by demonstrating the sequencing of 6 packets according to an example derived from the networks of FIG. 2. In the example of FIG. 3, packets are sent in a simple round robin fashion. The example is non-limiting and other packet sending approaches are possible.

Focusing particularly on the latency characteristic, consider 3 connections between the scheduler of the Multipath Transmitter and the sequencer of the Multipath Receiver:

1. LTE: 30 Mbps, 50 ms latency;
2. 3G: 2 Mbps, 120 ms latency; and
3. Satellite: 10 Mbps, 500 ms latency.

In this example, assume a client machine (C) 302 connected through the multipath transmitter 304 trying to send TCP traffic to a server (S) 310 reachable through the multipath receiver 308, and that the system 300 is not employing the TCP acceleration techniques described previously.

Consider a naive algorithm that round robins 6 IP packets among these connections and does nothing else "smart". Due to the extreme differences in latency, the server (S) receiving the TCP stream will observe the packets arriving in this order:

Packet 1 @t=50 ms (sent via LTE)
Packet 4 @t=50+ms (sent via LTE)
Packet 2 @t=120 ms (sent via 3G)
Packet 5 @t=120+ms (sent via 3G)
Packet 3 @t=500 ms (sent via Satellite)
Packet 6 @t=500+ms (sent via Satellite)

TCP is not well designed to handle major reordering of packets and large latencies between them. The server will send multiple duplicate ACKs for Packet 1 (to ensure that the client knows that the server is still waiting for a missing packet), causing any/all of packets 2/3/5/6 to be retransmitted—this is unnecessary since the packets are not lost, just still in transmission. For this reason among others, many existing solutions provide very poor throughput when trying to bond connections of extremely varying (or differing) latencies.

The sequencing function of the sequencer 162 of the gateways 104, 108 provides a technical solution by buffering the packets, and sending them in order so that the server ends up receiving the packets in the order that they were sent. The resulting order being:

Packet 1 @t=50 ms (sent via LTE)
Packet 2 @t=120 ms (sent via 3G)
Packet 3 @t=500 ms (sent via Satellite)
Packet 4 @t=500+ms (sent via LTE and buffered by the sequencer)
Packet 5 @t=500+ms (sent via 3G and buffered by the sequencer)
Packet 6 @t=500+ms (sent via Satellite)

In determining how large the buffer is, the scheduler 160 may be configured such that the determination is based at least partly on a bandwidth delay product. In some embodiments, the buffer length may be sized, for example, on flow requirements, jitter, historical data for performance of the connection set (e.g., how variable has delivery been on those connection, how often has the system recognized that it has either re-requested packets which arrived soon after (e.g., buffer may be too small), or times when minimal sorting was required by the sequencer (e.g., buffer may be needlessly large)).

For example if a number of similar networks with similar latency are used, the scheduler 160 may provide a smaller receive/sequencer buffer, because of a lowered chance of mis-sequencing occurring.

On the other side, the system may be configured to choose a larger buffer on the scheduler if either the sending endpoint or the connections are "bursty", so as to ensure that the network/pipeline can always be kept full. Buffer sizing may depend on which end, or on flow requirements. The buffer sizing may tend toward a smaller buffer on the sequencer if one needs lower latency to endpoint 2 and if the connections are otherwise good/predicable, or if the flow does not have strict requirements on packet ordering.

The buffer on scheduler 160 may be configured to ensure connection 106 is filled by endpoint 1, and the buffer on the sequencer 162 may be configured to minimize need for re-request of packets, while not causing unnecessary delays to delivery of packets to endpoint 2 by being too large.

In some embodiments, the scheduler 160 and the sequencer 162 are not configured to provide completely guaranteed ordered, reliable delivery of packets, but rather, the scheduler 160 and the sequencer 162 only need to reorder the packets enough so that the protocol (e.g. TCP) or application does not incorrectly treat the packets that are still being buffered/transferred as lost. For example, various protocols/applications may be using a multiple of the RTT as an indicator to decide whether or not a packet has been lost. As such, the scheduler 160 and/or the sequencer 162 may be operable to reduce extreme variability in the buffer time of packets.

In one embodiment, the system institutes buffers at both ends of the system to maximize throughput, with the first buffer releasing content to the network on a trigger. In an embodiment, the two buffers could adjust together to maintain a certain overall buffer length (in the scheduler 160 of Gateway A and the Sequencer of Gateway B). Accordingly, the buffers may act in concert to provide the overall buffer length and improve throughput while avoiding an overly long buffer (buffer bloat) on either the transmitter or the receiver. In another embodiment, the buffers may act independently of one each another.

Figure 4:
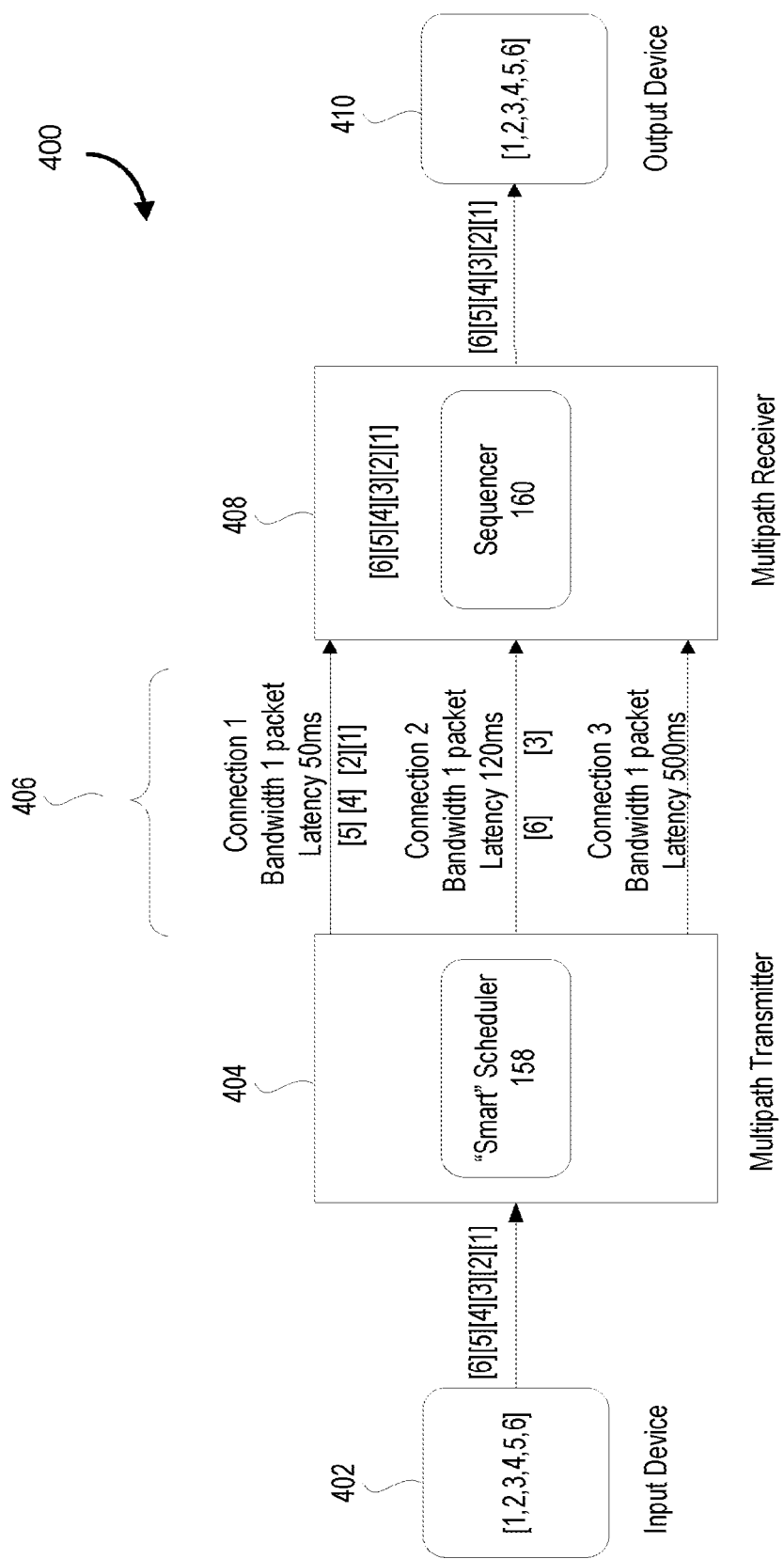
FIG. 4 is a block schematic depicting a scenario where the scheduler is configured to consider latency of the data connections, according to some embodiments.

FIG. 4 is a description of a case where the scheduler 160 is configured to be "smart" and is adapted to utilize latency in its determinations. In FIG. 4, a simplified example is provided for illustrative purposes where the three networks have the same bandwidth, but different latencies.

In this example, the bandwidth is defined as "one packet" for the simplicity of the calculation, but other bandwidths are possible. This assumption permits a simplified analysis whereby Packet 1 arrives @t=50 ms and Packet 2 @t=100 ms. If the bandwidth of the connection was greater than one packet then Packet 2 would arrive at t=51 ms, since it would be pipelined behind the first one (assuming, for example 1 ms of processing/pipelining delay). In another example, if it is desired to define the analysis in terms of Mbps or Kbps, the derivation may include an assumption that all packets are 1500 bytes, and connections have a bandwidth of 12 Kbps (1500*8). Other assumptions are possible.

For example:
Connection 1—bandwidth of one packet, latency 50 ms;
Connection 2—bandwidth of one packet, latency 120 ms; and
Connection 3—bandwidth of one packet, latency 500 ms.

A smart scheduler 160 is configured to route the packets such that the potentially time varying latency of the various links is taken into account in real time. This leads to a case in which the scheduler 160 would send packets only down Connections 1 and 2, since all packets could be acknowledged more quickly than even one packet could be sent via Connection 3 (e.g., based on the RTT).

The sequencer 162 on the multipath receiver 408 would receive the packets in the following order.
Packet 1 @t=50 ms (sent via Connection 1)
Packet 2 @t=100 ms (sent via Connection 1)
Packet 3 @t=120 ms (sent via Connection 2)
Packet 4 @t=150 ms (sent via Connection 1)
Packet 5 @t=200 ms (sent via Connection 1)
Packet 6 @t=240 ms (sent via Connection 2)

Assuming no dropped packets, and no congestion on the network, the packets would arrive in order and the sequencer 162 would simply pass the packets through in order without the need for re-ordering or buffering. In an embodiment where multiple connections had similar characteristics, the system may choose to have packets transmitted based on historical connection characteristics and reliability.

Where packets are received out of order or lost, the sequencer 162 may be configured to request the packet be re-sent across a determined most reliable connection. The multipath receiver 408 may be adapted, for example, to try to maintain an overall latency for the flow so that it has low variability. If the multipath receiver 408 is expecting a packet and it has not yet arrived (because it is lost, or the connection has reordered it unexpectedly), then whether it re-requests or just continues on (relying on the protocol (TCP) or application to handle the loss) may depend, for example, on a determined effect on the flow and its requirements.

Figure 5:
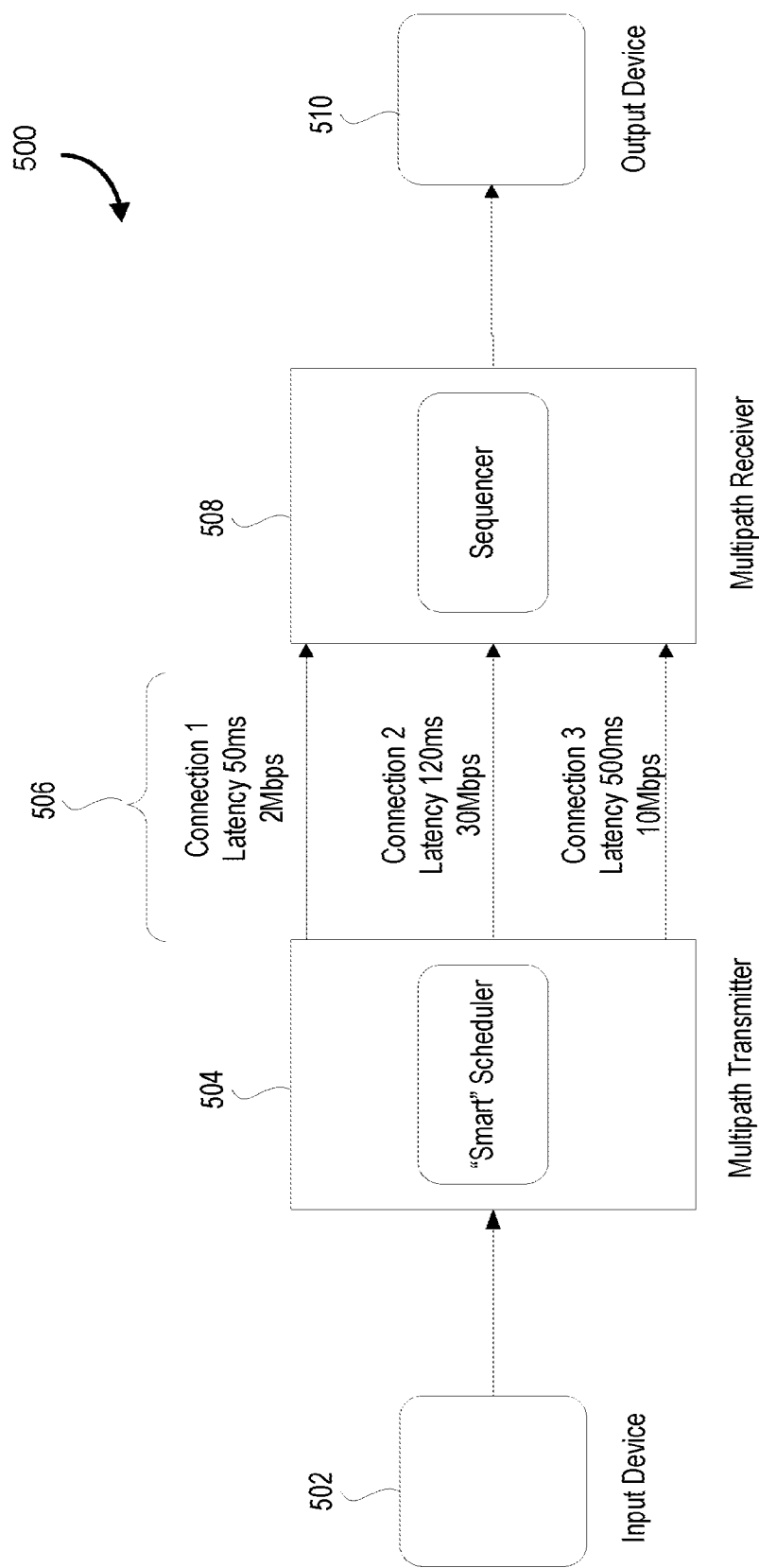
FIG. 5 is a block schematic depicting illustrative of the bandwidth delay product (BDP), according to some embodiments.

FIG. 5 is provided to illustrate the use of bandwidth delay product (BDP) and stickiness in relation to multi data connection routing of TCP packets. An input device 502 is depicted sending packets to output device 510 via transmitter 504, connections 506, and receiver 508, and that the system 500 is not employing the TCP acceleration techniques described previously.

Taking the case of FIG. 5, each of the 3 connections depicted at 506 has a different bandwidth-delay product (BDP). The illustrated BDPs and latencies are provided merely as examples and other values are possible. A BDP may be determined, for example, by multiplying the bandwidth by the delay (latency).

A 3G link (e.g., connection 1) would have the smallest BDP (2 Mbps*120 ms=~30 KB), once it is full (i.e. ~30 KB of unacknowledged packets are sent and in-flight in the pipeline), another data packet should not be sent through that link, or the data packet will be dropped and/or buffered, causing the TCP flow to incorrectly think that the channel capacity has been reached or causing latency of the connection to increase.

Accordingly, the correct approach would be transmission of that data packet across a different link instead (e.g., connections 2 or 3). Only when all links have reached their full BDP, should the system 100 be configured to drop the packet (or arbitrarily send it down any of the three connections), so that the TCP flow finally determines that the aggregate channel capacity has been reached, causing the TCP flow (e.g., a sending source 502) to reduce its overall transmission rate in response.

A technical challenge that arises is that the system 100 typically does not have information regarding the capacity of each connection. In some embodiments, a bandwidth estimation approach is applied to estimate the bandwidth value in view of imperfect information such that an improved routing decision may be applied (e.g., probabilistically improving expected throughput relative to naïve bandwidth estimations).

A bandwidth estimate (even if it is only somewhat accurate) is useful because without the estimate, the system 100 would only be able to determine when the connection 106 has reached channel capacity when the system 100 observes packet loss and/or an increase in latency. With an estimate, the system 100 may be configured to advantageously use techniques such as adding a percentage of FEC as the transmission rate starts to approach the estimate.

Once the receiver 108 needs to start using the FEC, the sender 104 may determine that this is indicative that channel capacity has been reached. This is improved over a system that does not use FEC, because channel capacity is been determined without causing any non-recoverable loss.

In some embodiments, a more accurate bandwidth estimation approach may be useful in determining that the system 100 should invoke an improved transmission mechanism, such as a weighted round-robin.

However, even with a perfect bandwidth estimation algorithm, it may not be optimal for a system 100 to utilize a weighted round-robin mechanism. If a flow doesn't require full channel capacity, all of its packets should be kept "sticky" to a single connection so that no buffering/reordering is required on the receiving side. That is, once a flow is assigned to a data connection it should keep using that connection. Only when the flow's needs exceed the capacity of the data connection it has been assigned, should it "overflow" onto another data connection.

The choice of overflow connection can incorporate any number of parameters into the decision logic to provide a range of benefits in terms of latency, through-put, reliability, jitter, cost, etc. or any combination of these factors. For example, the LTE BDP is 30 Mbps*50 ms=–187.5 KB and the satellite link is 10 Mbps*500 ms=–625 KB). If the satellite link was high cost, and the goal was low latency and low cost, the LTE connection would be "filled" with data before the satellite connection is used. Alternatively, if the satellite connection was significantly more reliable than the LTE connection and the goal was reliability then the satellite connection would be "filled" with data before the LTE connection was utilized.

Connections 106 may also be advantageously pooled so that connections with similar characteristics (latency, throughput, jitter and packet loss) are grouped together. This simplifies the connection management that must be done by the connection controller 154 because pooling means that fewer decisions need to be made within the connection controller. Because the characteristics of connections will vary over time, connections may join and depart pools in real time as needed to ensure reliable data communications. Any connection that has characteristics that differ significantly from all other connections will not be pooled and will be used as an individual connection.

Pooled connections also allow for meeting the needs of flows that have conflicting requirements. For example, consider a set of connections 106 in which all have consistently low latency but highly varying throughput. In this scenario, significant overbuffering would be required in order to achieve the maximum possible throughput, which could result in a significant increase in buffer bloat. If two flows are currently active, one which requires high throughput, and the other which requires low latency and low throughput, splitting the available connections 106 into two pools where one pool utilizes significant overbuffering and the other does not, would allow both flows to achieve their ideal quality of experience.

Descriptions of a bandwidth estimation approach are provided in FIGS. 8A, 8B, 8C, 8D, and 8E, where an estimation example is described that utilizes known information regarding network capabilities to estimate available bandwidth based on a number of packets to be sent and a packet size. Modifications are applied to account for non-idealities in a practical implementation, which may result in relation to interrupt moderation, coalescing, etc. The error levels associated with each packet may be determined and utilized in improving the bandwidth estimation, and the error may be dependent on the bitrate (e.g., as bitrate increases, the error may become negligible).

The throughput and latency of a connection (and hence the connection's bandwidth delay product or BDP) can also be estimated using congestion control techniques that are well-known in the art (Reno, Vegas, CUBIC and newer approaches like BBR). It may be advantageous to dynamically use different congestion control approaches depending on the characteristics of the individual (or pooled) connections and/or the requirements of the incoming data flows. Parametrically combining congestion control approaches for a single connection (or pool of connections) may also provide benefit as it will enable approaches that may better fit the needs of the connections (or pooled connections) and/or the incoming data flows.

Figure 6:
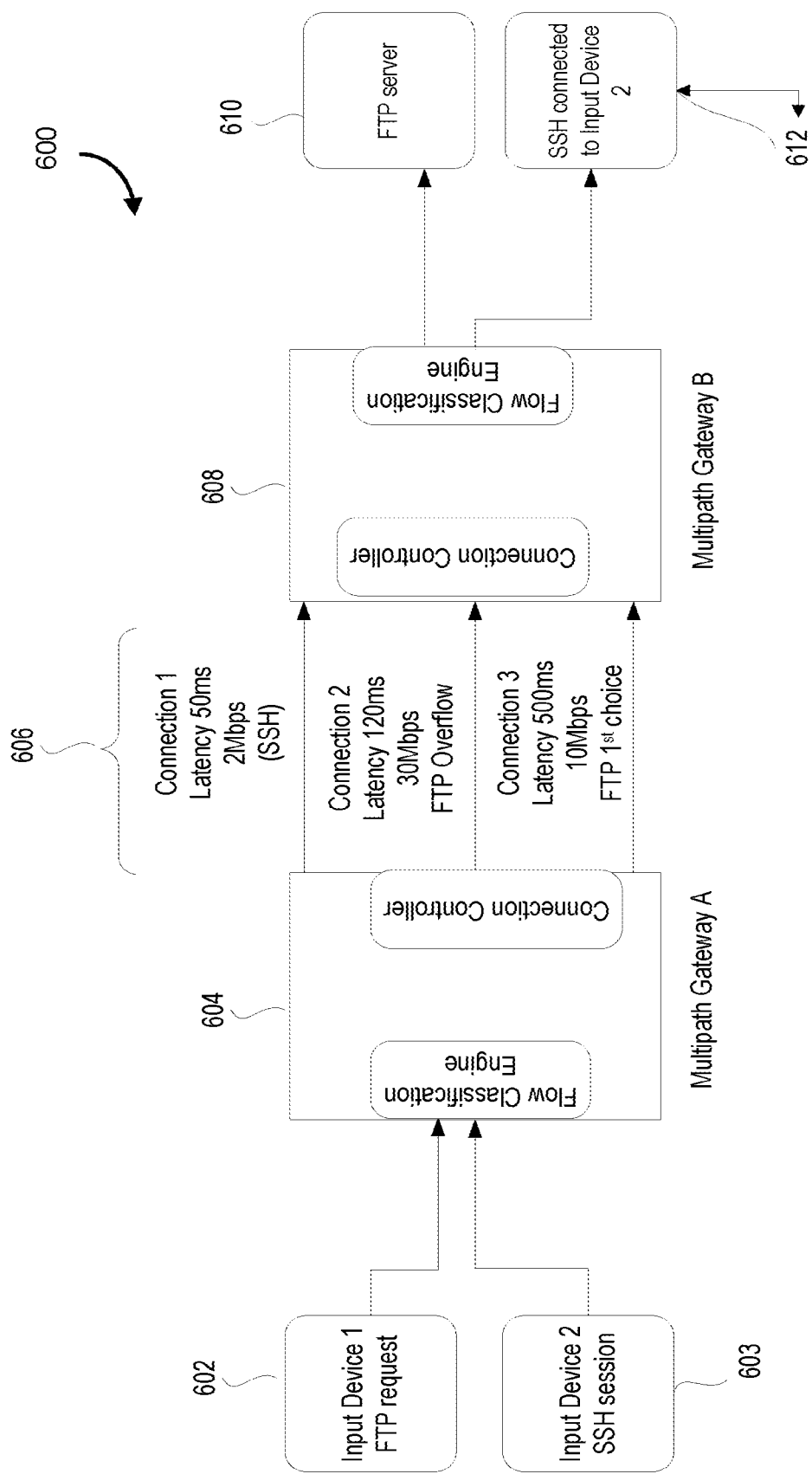
FIG. 6 is a block schematic depicting the system being adapted for basing operations at least on a dimension of flow requirements (size and sensitivity to latency), according to some embodiments.

FIG. 6 adds a dimension of flow requirements (size and sensitivity to latency). There may be different input devices 602 and 603, which may, as depicted, have different types of data being provided (602 is a FTP request, and 603 is a SSH session). These flows may require classification by the gateway 604 and may be advantageously provided through connections 606 based on the flow classifications to a receiving gateway 608 and through to an FTP server 610 and/or a SSH connection connected to input device 2 612.

Accordingly, with proper identification and categorization of flows, further improved assignment of data packets to data connections (or pools of connections) can be implemented. For example, if gateway 604 is operable to identify a flow as DNS traffic, gateway 604 could determine that the data stream will be small and latency sensitive, so gateway 604 keeps the data stream "sticky" to the connection(s) or pools of connections with the lowest latency. Conversely, if gateway 604 identifies that a data stream is a bulk FTP transfer, then gateway 604 should be configured to indicate a preference for routing to the connections with higher latency first, and only overflow to the lower latency connections or pools of connections if required and if there is excess capacity.

While the depicted embodiment includes a traffic identifier upfront, other solutions might use deep packet inspection, data packet or data stream labeling to identify the type of data stream and ensure proper handling by the flow classification engine. Such an approach may aid routing (e.g., SSH—use lower latency connections; HTTP—use higher latency connections). In an embodiment, some traffic types are always sticky (and hence no sequencer 162 required on the receiving end).

In an embodiment, packet marking by the sender (e.g. via DSCP (Differentiated Services Code Point)) can be used to aid in identification/categorization of flows, to further improve the assignment of packets to connections, and data flows In another embodiment, the nature of a flow is estimated using a heuristic based on the observed behaviour (e.g., given the one way nature and high bandwidth coming back to the initiator, the gateway 604 could be configured to by default assume that this is an FTP flow and adjust connection allocation accordingly).

In another embodiment, the classification can change dynamically based on the behaviour of the flow. For example, when an SSH flow first starts, it might be classified as a low bandwidth, latency sensitive flow. However, as the flow continues to transfer data, once it passes a certain threshold of volume, its classification might change to a latency insensitive, bulk data transfer (e.g. SCP/SFTP operation).

In FIG. 6, the flow classification engine is configured to determine (or estimate) that the nature of the traffic from Input Device 1 602 is FTP traffic, and, anticipating a large flow of data that is not latency sensitive, the system 100 will route the traffic first over a high BDP satellite connection, overflowing to the LTE connection as needed.

The flow classification engine 156 may also be configured to determine that the flow from Input Device 2 603 is an SSH session, and the gateway 604 may be configured to then select the low latency Connection 1 (or a pool of low latency connections) to handle the flow. The flow classification engine 156, in some embodiments, monitors and/or receives statistical information regarding incoming data streams that is utilized to help identify stream types.

In an embodiment, the system 100 combines its awareness of the multiple flow types in real-time, and dynamically adjusts the mix of connections or the mix of pools of connections used.

Figure 7:
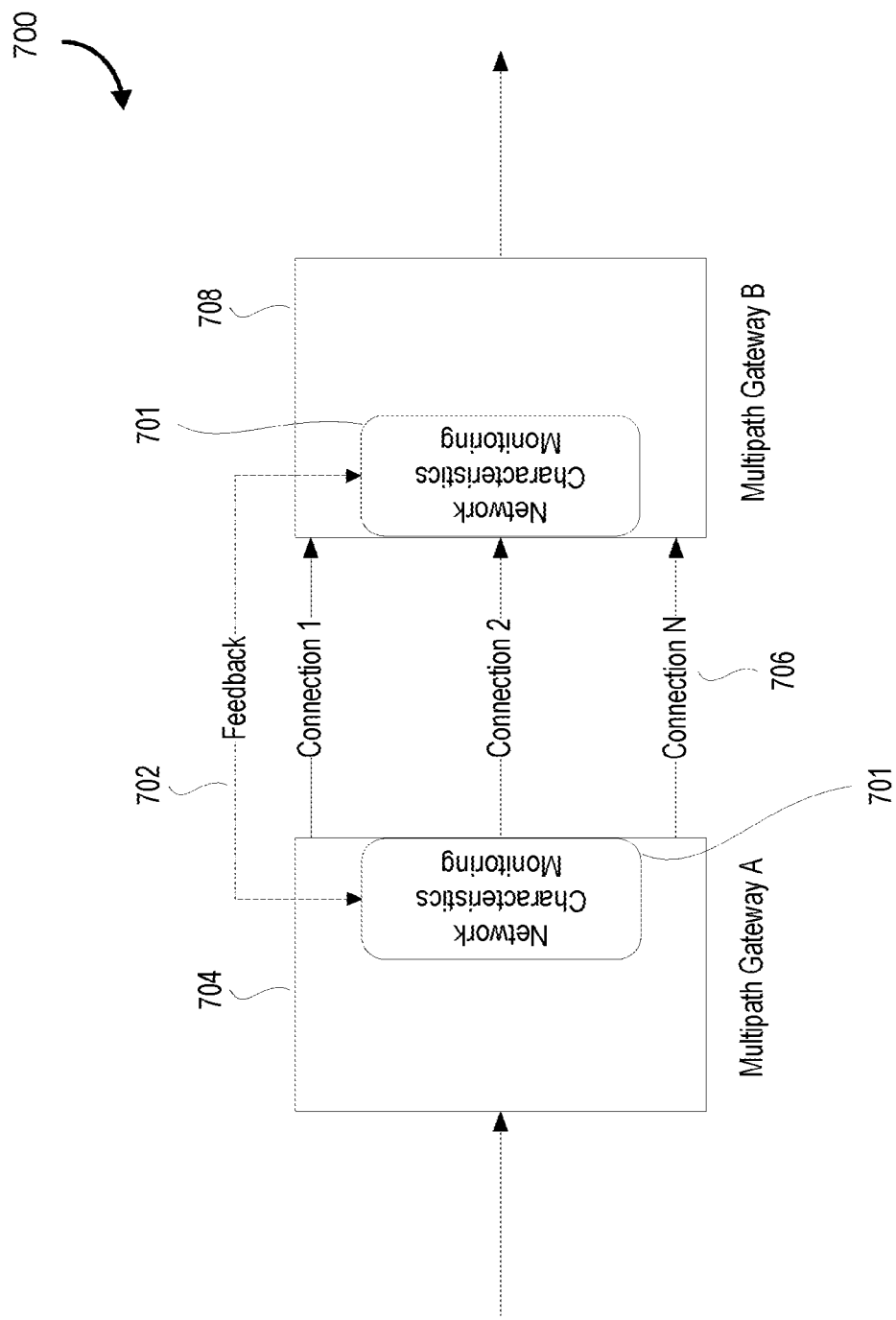
FIG. 7 is block schematic diagram depicting the operations of the network characteristic monitoring unit, according to some embodiments.

In an embodiment shown in FIG. 7, the system, 100 incorporates a network characteristics monitoring unit 701 at the transmitting multipath gateway 704, the receiving multipath gateway 708 or at both multipath gateways. Various factors are monitored and/or estimated by the system 100 to control how data traffic is allocated to the various connections.

These factors, for example, may be established through a determination of connection reliability that is used to determine how to improve the transmission of the packets (e.g. in some cases overall reliability will be more important than peak speed).

Connection reliability may be measured as a composite of one or more factors, including, for example, bandwidth, latency, jitter, packet loss, variability, among others.

In an example, the network characteristic monitoring unit 701 collects raw data such as throughput, packet loss, jitter, latency, packet ordering, and computes statistics on this collected data, typically but not limited to average, variance, kurtosis, order statistics, rank statistics, number of times over or under a pre-set/predefined threshold and other derived statistics.

If there are network characteristic monitoring units at both the receiver 704 and the transmitter 708, these network characteristics monitoring units may be configured to share their derived statistics in real-time or at pre-determined intervals over one or more of the connections 706 (shown at feedback 702). For improved reliability the shared derived statistics may be repeated over multiple connections (or pools of connections) to improve reliability.

In an embodiment, network characteristics monitoring unit 701 at the receiving end incorporates a measurement of how many bits were corrected by forward error correction (FEC) for each packet sent on a specific connection 706. This information may be processed to provide insight regarding error rate for the connection and is provided as part of the derived statistics.

FIGS. 8A, 8B, 8C, 8D, and 8E are illustrative of a bandwidth estimation method, according to some embodiments. The bandwidth estimation is provided to obtain a reasonably accurate estimate for the bottleneck bandwidth (bandwidth constraint) between a transmitter and receiver without transmitting at a rate anywhere close to the actual bottleneck bandwidth.

The estimated bandwidth is used along with other factors to determine an overall score or fitness level for a given data connection (e.g., network "goodness"). The system may be configured for a determination of expected bandwidths of all of the available data connections (e.g., networks) in order to weight the transmission of packets to the various data connections.

Figure 8A:
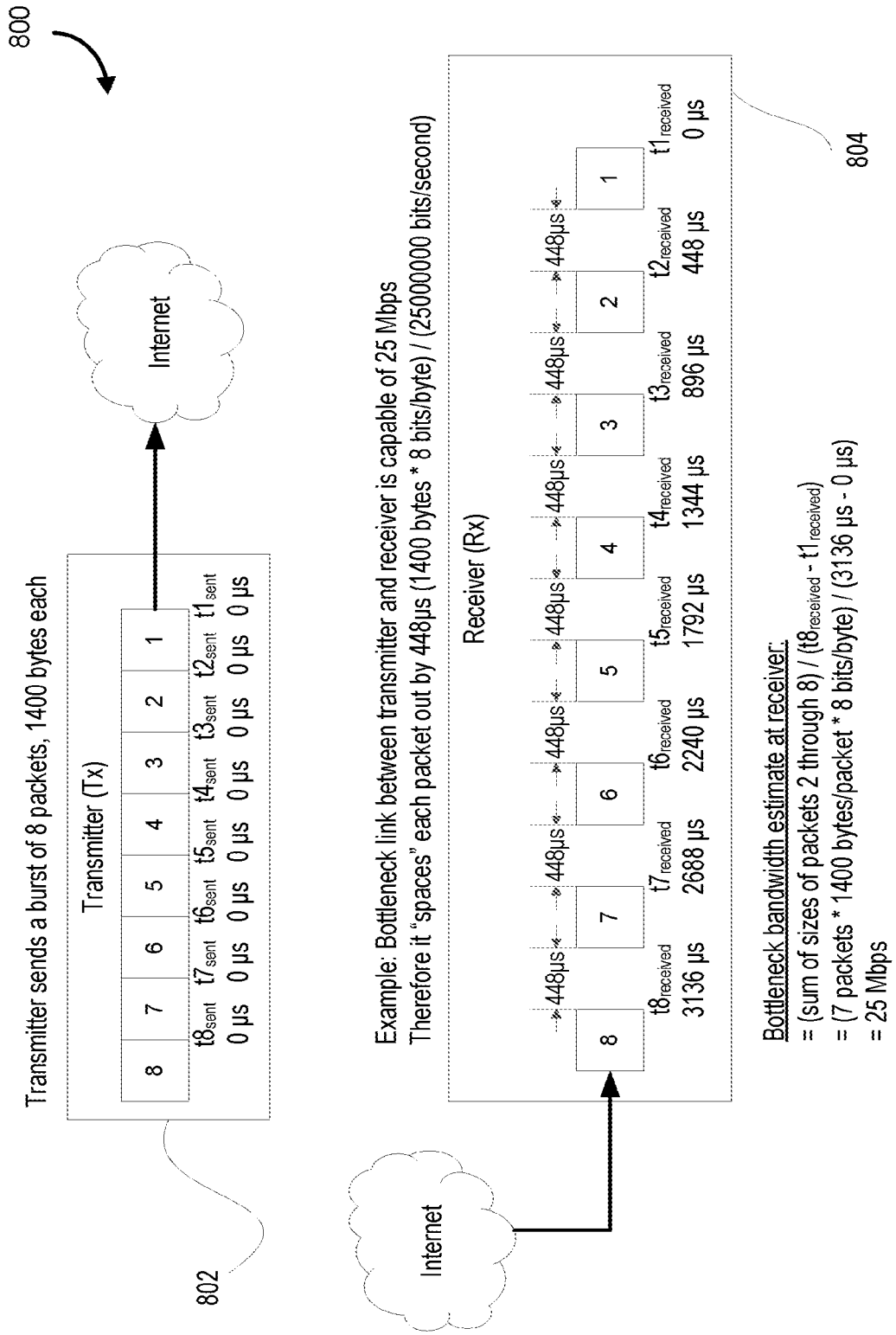
FIG. 8A is a description of an example bandwidth estimation method illustrating an example scenario where a transmitter sends a burst of 8 packets, according to some embodiments.

Referring to FIG. 8A, as illustrated in diagram 800, the example provided includes a transmission burst of 8 packets of 1400 bytes each from transmitter 802. In an ideal model of the network, the bottleneck link transmits these 8 packets at exactly the rate that it is capable, effectively inserting equal delays between each packet. In the example, the network is capable of transmission at 25 Mbps, so it inserts a delay of 448 microseconds between each packet.

At the receiver 804, the packets are received and time-stamps are recorded exactly 448 microseconds apart. The bandwidth estimation is based on the sum of the packet sizes (excluding the first packet), divided by the time required to transfer all of the packets. The size of the first packet is excluded because the time that it spent in the network is unknown. However, the time at which it was received marks the time at which the second packet began its transmission from the bottleneck link.

Figure 8B:
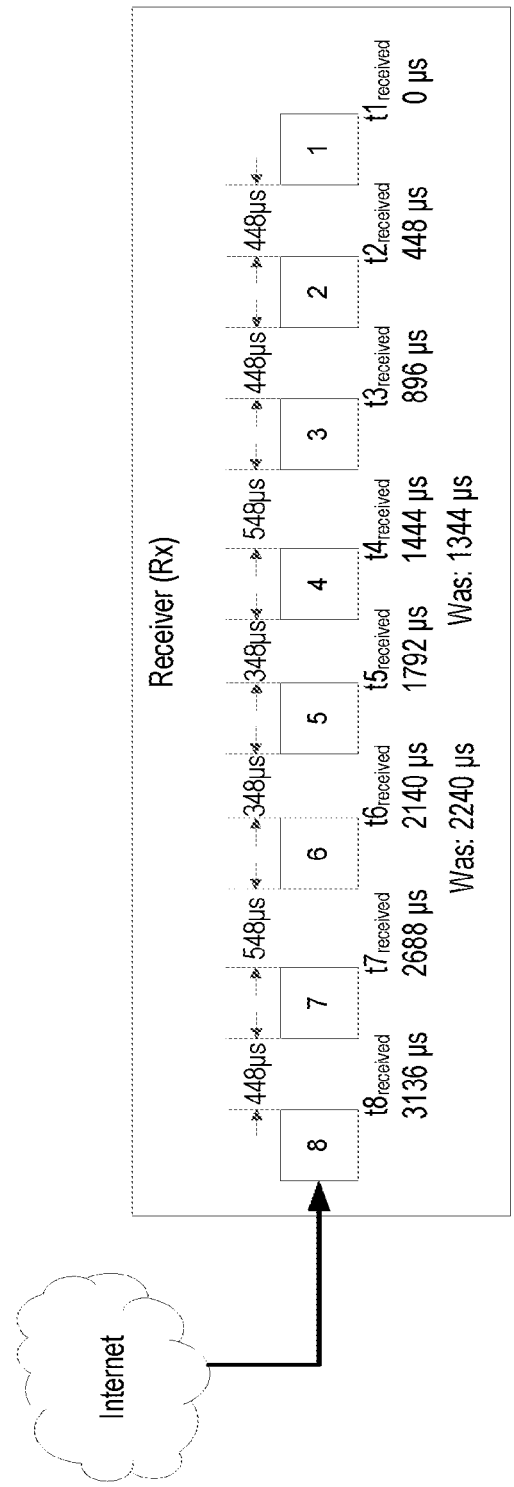
FIG. 8B is a description of an example bandwidth estimation method illustrating non-idealities in practical implementations, according to some embodiments

As shown in FIG. 8B, in practice, the sender, receiver, and intermediate routing systems can introduce errors in the bandwidth estimate due to competition with other traffic, variability of processing times, network interface card (NIC) optimizations such as interrupt moderation, etc. Compensating for errors may be conducted, for example, through the use of various statistical methods (e.g., averages, medians, etc.). The compensation for errors may improve the efficiency and throughput of the system, and in some embodiments, may result in adaptive modifications of characteristics of the routing.

Another technique for error compensation is to adaptively vary the number of packets in each burst, depending on the most recent bandwidth estimate. Generally, the longer the burst the more accurate the estimate because only errors introduced in the inter-packet arrival times at the head and tail of the burst affect the bandwidth estimate calculation. The longer the burst, the more the head and tail errors become negligible compared to the total burst duration. However, if the network has low bandwidth, a long burst may not be practical.

For simplicity of the examples in FIGS. 8A, 8B, 8C, 8D, and 8E, the bursts contain 8 equal sized packets, but the number of packets per burst, and the size of each packet in a burst do not need to be fixed. The bandwidth estimate calculation only requires knowing the total size of the packets, and the total duration of the burst. However, excessively small packets and/or short bursts could magnify the errors introduced at the head and tail of the burst.

In some embodiments, the packets in the burst can also contain real data (essentially piggybacking the metadata required for the bandwidth estimation algorithm on top of the data to be transmitted). The first packet (which will be discarded) may be used for this metadata. For increased reliability subsequent packets in the burst may repeat this metadata.

If piggybacking is not possible, or if there is insufficient real data to transmit, the bursts may be transmitted with "dummy" data, but burst length may be shortened even further so that the burst interferes as little as possible with the actual data transmission.

Techniques may be used to partially compensate for some types of errors such as those related to NIC interrupt handling.

Figure 8C:
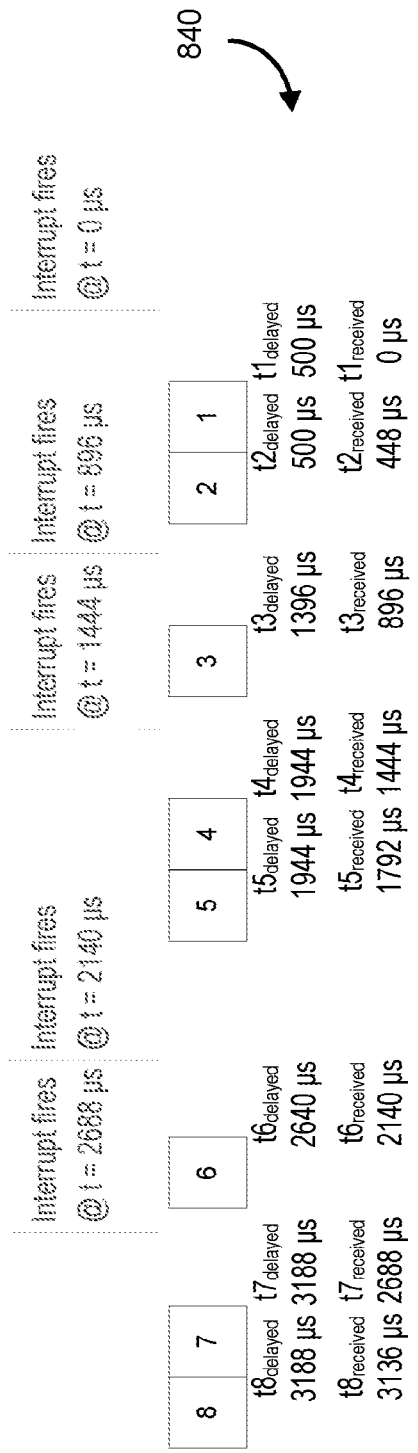
FIG. 8C is a description of an example bandwidth estimation method illustrating an example approach to correct for errors due at least in part to interrupt latency, according to some embodiments

FIG. 8C shows a timing example for a receiver where NIC interrupts are modeled as being handled with a significant delay, according to some embodiments. The method shown in FIG. 8C is utilized to correct for latency and packet bursts that occur as a result of NIC interrupts.

In this example, a determination correcting for the interrupt latency is shown, and contrasted against a naïve bottleneck bandwidth estimate. These interrupt delays may occur, for example, due to a network link between the transmitter and receiver that causes a bottleneck in received packets, leading packets to be received in bursts as opposed to the evenly spaced example of FIG. 8A.

When a packet is received, the interrupt fires, but does not execute until after a significant delay (500 microseconds in this example). During this delay, more packets could arrive such that when the handler finally runs, it collects all of the packets (the first one that triggered the interrupt, plus any that arrived during the delay) and delivers them to the application at the same time.

Error is introduced in this model because some packets within the burst are coalesced into groups, with all packets in the group being stamped with the same receive time. The error can be corrected due to the observation that if the coalesced packets are "trimmed" from the head and tail of the burst (meaning they are excluded from the bandwidth estimate calculation) the resulting packet dispersion pattern is identical to the non-delayed interrupt case. The only difference is that the effective duration of the burst is shorter due to the trimming, and each of the packet receive times are shifted in time equally by the interrupt delay.

Trimming from the head of the burst requires finding the first group that contains only a single packet. Trimming from the tail just requires ignoring all but the first packet in the last group of the burst.

Accordingly, in some embodiments, the network characteristic monitoring unit 701 tracks packet receipt characteristics (e.g., by determining bottleneck bandwidth estimates). As indicated in FIG. 8C, the network characteristic monitoring unit 701 of some embodiments is configured to additionally correct for interrupt latency, by for example, trimming for coalesced packets and incorporating a timeshift.

FIG. 8D shows a technique that can be used to compensate for interrupt latency if trimming from the head of the burst is not possible due to all groups containing more than one packet.

The technique may be performed, for example, by network characteristic monitoring unit 701 to correct for interrupt latency that occurs at a bottleneck link. Accordingly, network characteristic monitoring unit 701 is able to adapt for interrupt latency free of a requirement to be able to trim from the head of the burst.

The network characteristic monitoring unit 701 is configured to apply an idealized model of the bottleneck link, in which the receive time of a packet is equal to the send time of the subsequent packet from the bottleneck link (i.e. $t(N-1)_{received} = tN_{sent}$). As can be seen from the example, after making this substitution (in this case from $t2_{sent}$ to $t1_{received}$), it is clear that an estimate can be calculated even without trimming the head of the burst.

FIG. 8E shows a receiver where the NIC is modeled by the network characteristic monitoring unit 701 using interrupt moderation techniques, which may mean that the interrupt handler fires on a fixed timer—in this example, every 1000 microseconds.

Any packets that have been received since the last execution of the handler are collected and delivered to the application.

This introduces error into the estimate because the actual receive times of the packets are no longer visible to the application—the estimate will be based on the times at which the interrupts fire.

If the interrupt moderation interval is known (e.g. due to it being a system constant, or perhaps being measured in real time based on the frequency that groups of packets arrive at the application), upper and lower bounds can be calculated for the bandwidth estimate. Accordingly, in some embodiments, network characteristic monitoring unit 701 is configured to maintain a data structure representative of a latest estimated interrupt moderation interval as obtained from a corpus of tracked data values, the data structure utilized to estimate the interrupt interval, including upper and lower bounds on the bandwidth estimate.

The upper bound would be calculated assuming the last group in the burst was actually received just after the second-last interrupt. The lower bound would be calculated assuming the last group was received just before the last interrupt.

In one embodiment, the lower bound is the threshold at which FEC starts to be generated and transmitted on the connection.

On some systems, despite interrupt moderation, the actual receive time of each packet can be made available to the application by the NIC or the operating system kernel. On these systems, explicit compensation for error due to interrupt coalescing is not required.

The network characteristic monitoring unit 701, in some embodiments, is configured to utilize the lower and upper bound in determining packet receipt characteristics for reassembly.

FIG. 9 is a diagram 900 adapted to depict a simple example of satellite offload (single input) between Gateway A 902 and Gateway B 908. Dashed lines represent logical connection between components, and the physical connection flows through the bonded links.

Consider an example whereby there is one network (e.g., satellite or microwave) which a traffic manager 904 may have control over (can control who is on the network, and who gets priority bandwidth etc., can tune network parameters etc.), and other networks which traffic manager 904 does not control (e.g., third party cellular networks). Further consider that the controlled network may have certain characteristics (e.g., bandwidth is purchased in fixed "chunks" on a monthly basis so it is already paid for) that make it advantageous to ensure that it is "filled" with traffic (to reduce cost or maximize revenue), even if that means offloading portions of traffic to other networks.

An example would be the sending of video, wherein it is desired to deliver a specific level of transmission reliability that cannot be guaranteed or in some cases even provided by the cellular network. In this case it may be desirable to send as much of the video over the satellite network as is required to ensure the targeted level of reliability. If the satellite connection is not at full capacity (assuming one or multiple gateways transmitting at the same time) then it may also be advantageous to use as much of the satellite connection as possible to reduce the incremental cost of using additional cellular data. Note that other data can also be sent over the combined connection in combination with the video such as FEC information, or metadata, or actual portions of the video stream). In another embodiment, it may be advantageous to off load data from the satellite to cellular under control the network blender/traffic manager 904 such that gateways with good cellular bandwidth are instructed to use less satellite bandwidth.

A network blender/traffic manager 904 is configured to determine the optimal combination of networks (in some embodiments, one or more of the networks are controlled, in which case the network blender/traffic manager 904 still has value as it provides oversight on all networks and routes based on real-time measurements of through put, reliability, packet loss etc.). In an embodiment, one or more of the available network connections is "controlled" (as per above), and network blender/traffic manager 904 receives real time information from the gateways and is configured to control the bandwidth used by the gateways (the "edge nodes") such that the overall network is managed by the network blender/traffic manager 904.

In an embodiment, a controlled network management system (CNMS) 906 may have a set of logical operations (e.g., static logical operations, dynamic logical operations) to determine the allowing of certain traffic (e.g. per user or traffic type, priority based on cost, reliability etc.) under certain conditions. The set of logical operations may be based provided in various data storage and stored at the gateway, the source/endpoint, or the cloud.

In some embodiments, the set of logical operations is stored in the traffic manager 904 as well, and the traffic manager 904 may utilize logical operations from the controlled network management system 906 in combination with other logical operations that apply to the overall transmission (e.g., a user may not pay much for controlled satellite, and may be intentionally pushed off of the controlled satellite, but may pay for overall transmission, and thus receive priority on rest of the data connections of system 100 such that there may be preferential treatment in relation to a selection or allocation of higher cost/reliability non-controlled networks).

In an embodiment, the Network Blender/Traffic Manager 904 may interact with the CNMS 906 to alert the system, multipath gateways 902 or devices connected to multipath gateways regarding prevailing network conditions such that the system 100 can be configured to better allow the network blender/traffic manager 904 to utilize both the controlled network, and any other transmissions that the network blender/traffic manager 904 may be managing.

For example, multiple connections may be available, and the network conditions affecting each of the connections may vary over time. For example, as congestion, loss and noise are experienced by each of the connections, the connections may be advantageously allocated to uses or functions based, for example, on their connection characteristics. Such "bonding" of connections and allocation of functions thereof is described in Applicant's U.S. Pat. No. 9,357,427, which is incorporated by reference.

FIG. 10 is a diagram 1000 that provides an example of blending where there are multiple gateways connected to multiple controlled and uncontrolled networks.

Dashed lines represent logical connection between components, and the physical connection flows through the bonded links.

There may be N multipath gateways (e.g., 1002, 1003), each working in concert in relation to a network blender/traffic manager 1004 and a CNMS 1006, such that the flows from the multiple endpoints through the multiple gateways is provided with the best quality of experience, taking into account factors such as contention for resources on the controlled networks (under control of 1004 and 1006), service level purchased by the owners of the gateways, quality and availability of connectivity on the uncontrolled networks attached to the gateways, requirements for the flows and applications generating traffic through the gateways, etc. Transmissions may be ultimately provided to multipath gateways AA-NN (e.g., 1008, 1010). The gateways deliver bonded functionality with known and controlled quality of service for each gateway on the network. In this context, quality of service means allocation of bandwidth for specific applications or classes of applications through smart management of bandwidth provided by the network blender/traffic manager 1004 and the CNMS 1006.

The gateways may have been sold (or guaranteed) different levels of connection reliability. If a gateway that was guaranteed high reliability (or dynamically requests it), and is not receiving high reliability, the network blender/traffic manager 1004 may be configured to provision (e.g., "steal") more reliable (e.g., satellite) bandwidth from another gateway to deliver this increased reliability to the gateway that requested (or was guaranteed) higher reliability.

The network blender/traffic manager 1004 manages allocation of traffic through the controlled network from multiple gateways, optimizing on the set of transmissions based on real time measurement of network characteristics (provided by the gateways) and a set static or dynamic logical operations (quality of service rules).

In an embodiment a network blender/traffic manager 1004 may be dedicated to managing the traffic of a particular user/organization. In another embodiment, the network blender/traffic manager 1004 may be configured to serve a wide variety of users. Where there may be multiple network blender/traffic managers 1004, the resources may communicate with each other as required and be provided on an as-needed basis, where resources are provisioned/de-provisioned ("spun up or down") as needed. Network blender/traffic manager 1004 and controlled network management system 1006 may, in some embodiments, be provided in the form of distributed network resources (e.g., in a cloud configuration, and may be run "in the cloud").

Dynamic logical operations may be provided to address how the controlled network is to be utilized as new transmissions over the controlled network are occurring (e.g., the priority given to any particular transmission may depend on the other transmissions underway).

FIG. 11 is a diagram 1100 provided to illustrate a one-to-one scenario configured for an un-bonded disaster recovery/load balancing application. In this situation, individual flows may remain sticky to a particular connection with no bonding whatsoever, wherein the buffer isn't needed on the receiving end such that there is no second gateway. The algorithm for assignment of flows to a connection can be based on static or dynamic rules, taking into account factors such as flow requirements, connection quality/reliability, transmission cost, computational limits on the gateway, etc.

In an embodiment, the gateway 1102 is configured to add or remove connection links as needed (e.g., depending on throughput, or traffic type(s)), not bonding but setting up individual sockets between the communication two endpoints.

In some embodiments, the connection may be bonded but not transmitting any data, and such an implementation may provide technical advantages in a fail-over scenario, where there may be a need to know that the connection is going to work, and having the connection active allows the system to test the connection periodically to confirm operation and/or move data streams (or flows) over to the new connection should the need arise.

In an embodiment, certain types of traffic from the site facing a disaster recovery scenario may be configured to be routed through particular a backup link (or set of links) to reduce cost, increase security, minimize latency, jitter etc., or any combination of such factors.

There may be, for example, uses for the system for disaster recovery as a service tool (or adaptive load balancer) that doesn't need to route through a receiver/second gateway, where embodiments of the solution above may be utilized to provide more robust connectivity.

FIG. 12 is a diagram 1200 provided to illustrate a sample bonded disaster recovery/load balancing application, where traffic is bonded and routed through a second gateway 1204, according to some embodiments.

As depicted in FIG. 12, in an embodiment, a large organization (or one requiring security) could have two dedicated gateways 1202 and 1204 in a (relatively) closed system. In another embodiment, a customer may simply be assigned a public gateway 1204 "in the cloud". The implementation of FIG. 12 serves to provide increased security as the use of the staged gateways isolates the network from potential malicious attacks from the Internet, and provides a coordinated section to apply security policies and protocols, including quality of service for incoming and outgoing data streams (or flows).

FIG. 13 is a diagram 1300 illustrating a series of multipath gateways 1304, 1306, and 1308 connecting two or more endpoints 1302 and 1310. FIG. 13 depicts a scenario where in a field operator at Endpoint 1 1302 requires the benefit of having multiple paths in order to carry out a transmission (e.g. a soldier in a remote location sending out video and other data providing situational awareness info to headquarters). Multipath gateway combinations (e.g., gateways 1304, 1306, and 1308) may be needed to accomplish this. For example, the first hop of the transit may involve using multiple WiFi networks to get the data from the field to a nearby forward operating base. At the forward operating base, a gateway may then send the data via a different set of communications links (e.g. a number of cellular networks) to the regional headquarters, where another gateway would then use one or more fiber links to pass the data on to a national headquarters, which might in turn use a different combination of links to send the data back out to a different field location.

In an embodiment, the data is available to applications at one or more stops along the transit. In another embodiment, the data is transmitted from end to end without being accessed by applications along the way.

In some embodiments, a system may be provided that is configured for managing multiple start/end points using overlapping pools of networks, where an intelligent engine uses knowledge of the activity of the various devices and the various networks to better manage the flow of transmissions. In such implementations, the system may be configured to perform sequencing, or manage network usage, in accordance with data residency logical operations (e.g., logical rules).

Figure 14:
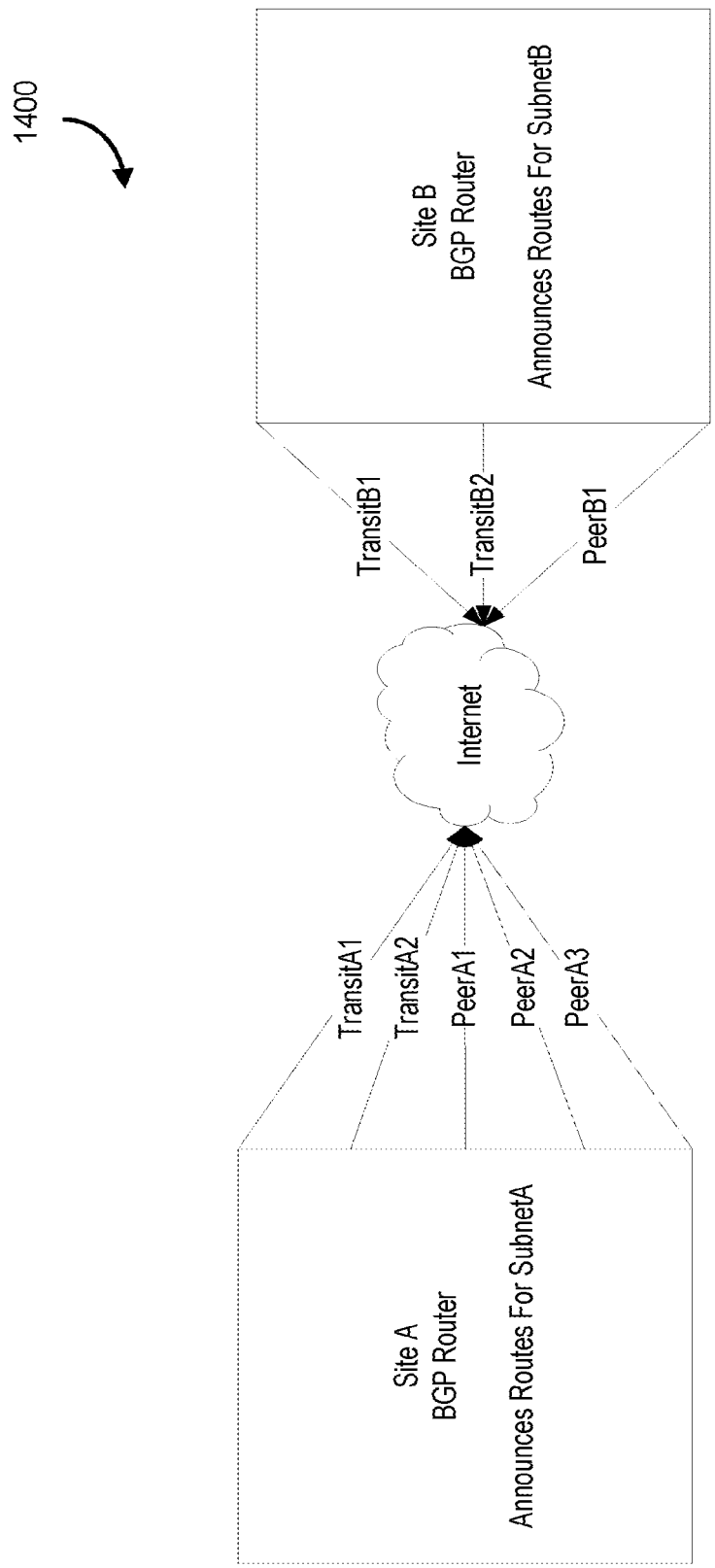
FIG. 14 shows two multi-homed sites connected to the Internet in a traditional Border Gateway Protocol (BGP) transit/peering configuration, according to some embodiments.

FIG. 14 is a diagram 1400 depicting two sites that are connected to the Internet over multiple links, using typical transit and/or peering arrangements with Border Gateway Protocol (BGP)-based edge routers. In this example, Site A announces BGP routes for Subnet A to its upstream peers/transit providers, and Site B announces BGP routes for Subnet B.

BGP is a "coarse" distance-vector routing protocol, meaning the primary factor in how it decides to route packets is based on the number of autonomous systems (AS) that the packets would traverse to arrive at the destination subnet. It does not take into account congestion within each AS, nor does it natively support multihoming.

For example, if the network path TransitA1 was deemed the shortest path for traffic from Subnet B to Subnet A, all inbound traffic to Subnet A would arrive via TransitA1, even if it is congested. All other links (TransitA2, PeerA1, PeerA2, etc.) would not be utilized.

An approach to work around this limitation is to partition Subnet A into smaller subnets, and selectively advertise them over a subset of the links. This is suboptimal because the traffic patterns on each of the smaller subnets likely will not represent the desired split among the given links at all times. The smaller subnets also contribute to increased global BGP table size—generally speaking, subnets smaller than a/24 are not accepted in the global BGP table.

The comparison with BGP routing between two sites is used as an example in this figure, but is not a requirement. The two sites may simply be multihomed through different providers, with no publicly advertised subnets. In such a situation, a fully connected graph between the two multipath gateways would still be established, with traffic between the two sites routed on the connections according to any previously mentioned criteria (e.g. connection cost, flow requirements, connection quality/reliability, etc.)

Figure 15:
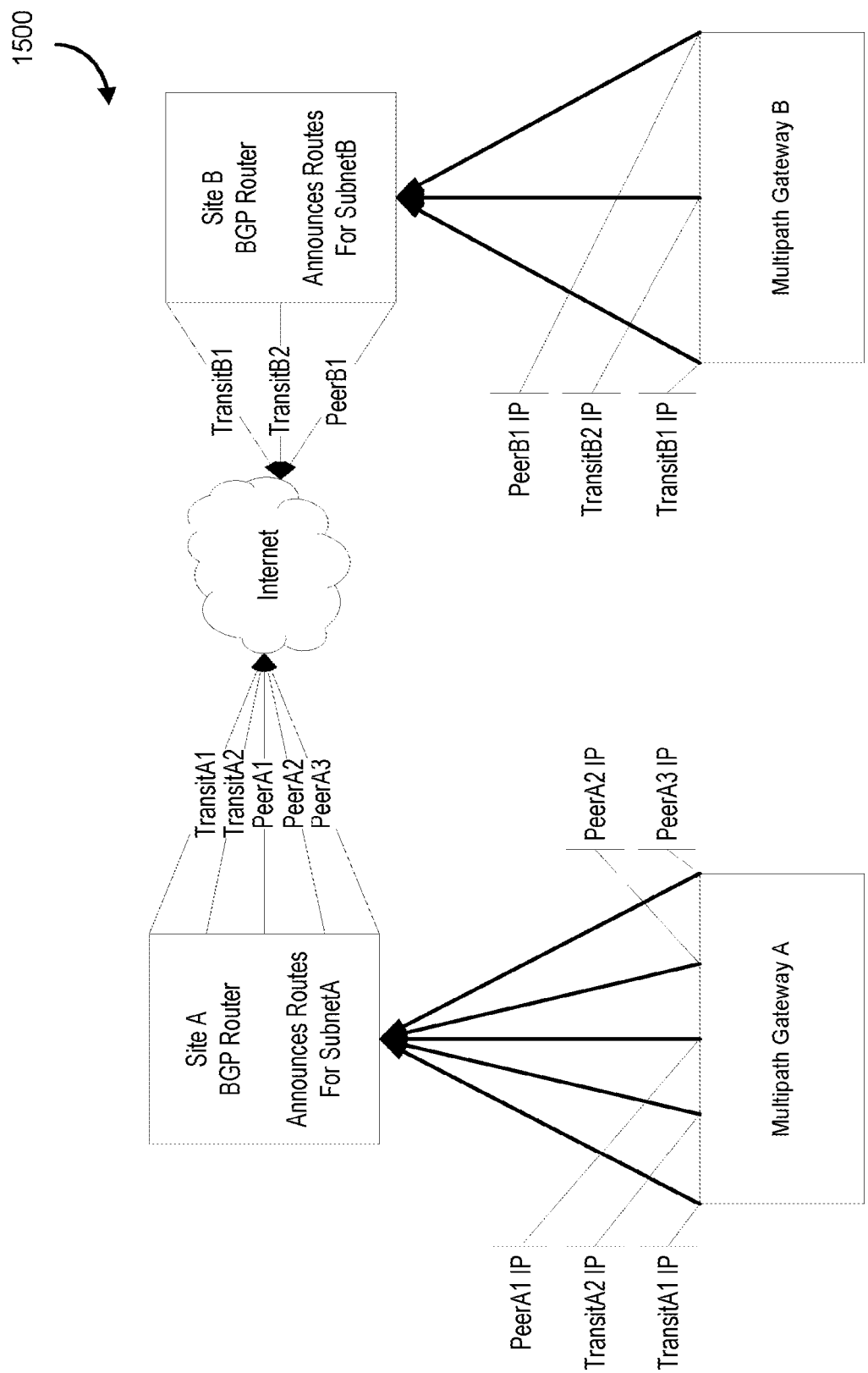
FIG. 15 shows the same two multi-homed sites connected using multipath gateways, allowing granular control of how both outbound and inbound traffic between the two sites is routed, according to some embodiments.

FIG. 15 includes diagram 1500 showing the same two sites connected with two multipath gateway systems 100. The connection controllers 154 form a fully connected graph, connecting TransitA1 to all of (TransitB1, TransitB2, PeerB1), TransitA2 to all of (TransitB1, TransitB2, PeerB1), and so on.

The flows generated by hosts and applications on Subnet A and B are no longer routed based on the advertised BGP routes, but are instead encapsulated in the protocol between the two multipath systems 104 and 108, which communicate directly via IP addresses on the transit and/or peering networks.

This allows the multipath systems to route packets based on any number of the aforementioned criteria (e.g. the latency and throughput requirements of each flow, detected congestion/contention, jitter, cost, administrator policy, etc.).

In some embodiments, one or more aspects of the system and/or methods described herein may seek to maximize the throughput of the total flow of transmissions across multiple links, while meeting all latency and packet loss constraints for each transmission.

In some instances, some of these issues may be addressed by managing buffer bloat, which is latency created by excess buffering on a link. Buffer bloat can lead to packet delay variation (jitter) and lead to increased latency.

If connections are overloaded, the latency will increase on the overloaded connections—which will increase the bandwidth delay product (BDP) without a corresponding increase in throughput.

In some embodiments, managing buffer bloat can involve selecting a buffer size that reflects the BDP of the various connection types. This can be represented as:

$$\sum_{i=1}^{n} k_i * bdp_i(t) = \text{Total buffer size}$$

where "i" is the connection number, $k_i$ is a constant used to manage buffering on the gateway (as outlined below) and $$bdp_i(t)=[\text{throughput}_i(t) \times \text{RtProp}_i(t)]$$

where $\text{RtProp}_i(t)$ is the base propagation delay of the connection.

For simple connections where $\text{throughput}_i(t)$ and $\text{RtProp}_i(t)$ either do not vary with time, or vary slowly, maximizing overall throughput while meeting latency constraints can be solved so long as:
  There exists a subset of connections where every $\text{RtProp}_i(t)$ is <=latency requirements of the low latency flows; and
  The sum of $[k_i * bdp_i(t)]$ over at least one of the subsets is >=the volume of data being generated by the low latency flows If there exists a subset that meets this criterion, then the sum of $[k_i * bdp_i(t)]$ over all of the remaining connections (and including the partial BDP of the connections that are not fully consumed by the low latency flows) can be used for the latency insensitive flows.

The maximization problem becomes apparent when there are connections where $\text{throughput}_i(t)$ and $\text{RtProp}_i(t)$ change rapidly and over such a large range of values that it is not possible for the system to accurately follow the instantaneous value of $bdp_i(t)$. For these types of connections, the system can be configured to measure/observe $bdp\_min_i(t)$ and $bdp\_max_i(t)$ (measured from the min/max of $\text{throughput}_i$ and $\text{RtProp}_i$).

For the case where the $\text{throughput}_i(t)$ and $\text{RtProp}_i(t)$ change, a statistical approach based on the distributions of observed $\text{throughput}_i(t)$ and $\text{RtProp}_i(t)$ can be used. In some instances, this may rely on conditional probabilities or iterative, heuristic approaches. Machine learning or artificial intelligence approaches may also be employed.

The system is configured to address a maximization problem while meeting latency constraints when determining the optimal partitioning of the connections. There may be multiple connection subsets that satisfy these constraints:
  Low latency subsets
    Find all connections where $\text{RtProp\_min}_i(t)$ is <=latency requirements of the low latency flows; and
    Find all subsets over these connections where sum of $bdp\_min_i(t)$ is >=volume of data being generated by the low latency flows
  High latency subsets
    For each viable subset calculated above, over the remaining connections (the ones that are not in the subset), sum $bdp\_max_i(t)$. The goal is to find the subset(s) that maximizes this sum
Determining $k_i$ In the simple case $k_i$ is a constant, and hence selects the buffer size for a connection as some percentage of the BDP for a connection. Empirically, it was found that a value of $k_i=1.2$ works well in practice (e.g. the system is configured to buffer 20% more than the BDP of a given link).

In the complex case, $k_i$ is a function of the flow types travelling across connection i (and any constraints related to those flow types), the variance of $bdp_i(t)$ (which may be computed in real time and used to adjust $k_i$ in real time), and the connection characteristics (latency, jitter, throughput)) wherein one determines what latency is required for the flow types and what throughput is required (and what combination is minimally acceptable for those flow types) meaning that $k_i$ is a function of flow type, BDP variance and connection characteristics:

$$k_i = f(\text{flowtype}, [\text{var}(bdp)]\_i(t)), \text{connection characteristics})$$

With WiFi and LTE connections, the variation in latency can be quite rapid and can cover a range over a couple orders of magnitude—e.g. WiFi can go from <10 ms to >100 ms.

If the amount of buffering chosen assumes <10 ms latency (i.e. a small $k_i$), whenever the actual latency is >100 ms, there will be insufficient data available to keep the network full, resulting in sub-optimal average throughput.

If the amount of buffering assumes >100 ms latency (i.e. a large $k_i$), the network may always be kept full or close to full (resulting in optimal average throughput), but whenever the actual latency is <10 ms there will be additional latency due to buffering (buffer bloat).

In this example, if there are flows that require low latency, the system must make a tradeoff and keep the buffering on the connections used for the transmission of low latency flows at a level assuming <10 ms latency (i.e. a conservative/small value for $k_i$, and $bdp\_min_i(t)$). In some instances, this may result in overall lower average throughput, but no buffer bloat is introduced that would violate the flow's requirements. The system can be configured to do the converse on the remaining connections for flows that require high throughput and are latency insensitive.

The foregoing discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

Network gateways for controlling data flows across network connections are described herein, along with corresponding methods, devices, and computer readable media. The gateway may, in some embodiments, be a physical hardware device that includes components, including processors, interfaces, buses, power supplies, memory (ROM, RAM, flash), that are configured to receive and route data packets, in accordance with instruction sets representative of software and embedded firmware in the form of programmatic code or computer logic.

The programmatic code and/or computer logic include control logic and the device, in some embodiments may operate as a controller, a router, a switch, an access point, etc., and the device may be configured to operate in a manner transparent to end users (aside from potential performance improvements, especially as large amounts of data flow through the device.

The network gateway may, in an example, be a specialized computing device specifically optimized for bonding TCP connections, as described in some examples herein. The network gateway, in an alternate example, may be implemented using processors and/or other computing hardware as part of a larger system. The network gateway may be a single device, or in some cases, may be multiple devices that operate in concert.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A network gateway for routing data flows across a plurality of network connections, the network gateway comprising:
    a plurality of network interfaces for transmitting data over the plurality of network connections; and
    at least one processor configured for:
    monitoring time-variant network transmission characteristics of the plurality of network connections;
    generate a bandwidth estimate of a first network connection of the plurality of network connections based on timestamps when test packets are received at a receiving node and a size of the test packets, the test packets sent alongside data packets or as payloads embedded within the data packets;
    parsing at least one packet of a data flow of packets to identify a data flow class for the data flow, wherein the data flow class is associated with at least one network interface requirement for the data flow;
    transmitting the test packets as a sequential burst of packets across a first network interface of the plurality of network interfaces;
    for each packet of the packets in the data flow, providing the packet for routing over one of the plurality of network connections based on the data flow class and the bandwidth estimate of the plurality of network connections and the network connections of other packets in the data flow such that the packets in the data flow arrive at a destination node in a desired sequence; and
    wherein the bandwidth estimate of the first network interface is generated using a sum of packet sizes for packets between a first packet in the burst and a second packet in the burst that are divided by a time elapsed between a timestamp for the first packet and a timestamp for the second packet, wherein the first packet is not the initial packet in the burst, and wherein the second packet is subsequent to the first packet in the burst.

2. The network gateway of claim 1, wherein monitoring the time-variant network transmission characteristics includes generating a bandwidth delay product of at least one network interface of the plurality of networks based on the monitored time-variant network transmission characteristics; and wherein routing the packets in the data flow is based on the bandwidth delay product of the at least one network interface.

3. The network gateway of claim 1, wherein the at least one processor is configured to parse at least one packet of each of a plurality of data flows of packets; and
    routing the packets in each of the plurality of data flows based of the data flow class of each of the plurality of data flows, and available bandwidths of the network connections corresponding to the data flow classes of the respective data flows.

4. The network gateway of claim 1, wherein the processor is configured for generating the bandwidth estimate of the first network interface by dividing the sum of packet sizes for packets between the first packet in the burst and the second packet in the burst by the time elapsed between the timestamp for the first packet and the timestamp for the second packet, wherein the first packet is not the initial packet in the burst, and wherein the second packet is subsequent to the first packet in the burst.

5. The network gateway of claim 1 wherein generating the bandwidth estimate of the first network interface comprises: generating the bandwidth based on the timestamps of packets in the burst which are not coalesced with an initial or a final packet in the burst.

6. The network gateway of claim 1, wherein generating the bandwidth estimate of the first network interface comprises: substituting a received timestamp for a particular packet in the burst with a sent timestamp of a packet sent after the particular packet.

7. The network gateway of claim 1, wherein when the receiving node processes received packets at periodic intervals, generating the bandwidth of the first network interface comprises:
generating a lower bandwidth value by using a received timestamp for a packet in the burst selected as an end packet in the bandwidth determination; and
generating an upper bandwidth value by substituting the received timestamp for the packet in the burst selected as the end packet with a received timestamp of a packet in the burst preceding the end packet.

8. The network gateway of claim 1, wherein the desired sequence is represented using a sequence number associated with each data packet.

9. The network gateway of claim 8, wherein the desired sequence is an original sequence of packets in the data flow.

10. The network gateway of claim 8, wherein the desired sequence is a sequence including at least one misordering of packets which does not trigger re-transmission of a packet in the sequence.

11. The network gateway of claim 1, wherein the at least one processor is configured for:
receiving packets from a source interface for routing to a destination node via the plurality of network connections;
transmitting acknowledgements to the source interface before routing the packets to the destination node; and
storing the packets in at least one buffer before the packets are routed to the destination node.

12. The network gateway of claim 11, wherein the at least one processor is configured for dynamically controlling a size of the at least one buffer based on a bandwidth delay product associated with the plurality of network connections.

13. The network gateway of claim 11, wherein the at least one processor is configured for controlling the transmission of acknowledgements and storage of the packets based on monitored of transmission characteristics of the plurality of network connections, and an uneven distribution in the receipt of the data flow of sequential packets.

14. The network gateway of claim 1, wherein the at least one processor is configured to route the packets reduce a number of network connections over which the data flow is routed.

15. The network gateway of claim 3, wherein the at least one processor is configured to group packets of the plurality of data flows which have similar data flow classes; and routing grouped packets over the plurality of network connections based on a classification of the plurality of data flows.

16. The network gateway of claim 1, wherein a data flow class of one of the plurality of data flows is automatically changed once a threshold volume of data of the corresponding data flow has been routed.

17. The network gateway of claim 1, wherein the data flow of packets are data packets including at least one of video and audio data.

18. A method for routing data flows across a plurality of network connections using a network gateway having a plurality of network interfaces for transmitting data over the plurality of network connections, the method comprising:
monitoring time-variant network transmission characteristics of the plurality of network connections;
generate a bandwidth estimate of a first network connection of the plurality of network connections based on timestamps when test packets are received at a receiving node and a size of the test packets, the test packets sent alongside data packets or as payloads embedded within the data packets;
parsing at least one packet of a data flow of packets to identify a data flow class for the data flow, wherein the data flow class is associated with at least one network interface requirement for the data flow;
transmitting the test packets as a sequential burst of packets across a first network interface of the plurality of network interfaces;
for each packet of the packets in the data flow, providing the packet for routing over one of the plurality of network connections based on the data flow class and the bandwidth estimate of the plurality of network connections and the network connections of other packets in the data flow such that the packets in the data flow arrive at a destination node in a desired sequence; and
wherein the bandwidth estimate of the network interface is generated using a sum of packet sizes for packets between a first packet in the burst and a second packet in the burst that are divided by a time elapsed between a timestamp for the first packet and a timestamp for the second packet, wherein the first packet is not the initial packet in the burst, and wherein the second packet is subsequent to the first packet in the burst.

19. A non-transitory computer readable medium, storing machine executable instructions, when executed by a processor, cause the processor to perform a method for routing data flows across a plurality of network connections using a network gateway having a plurality of network interfaces for transmitting data over the plurality of network connections, the method comprising:
monitoring time-variant network transmission characteristics of the plurality of network connections;
generate a bandwidth estimate of a first network connection of the plurality of network connections based on timestamps when test packets are received at a receiving node and a size of the test packets, the test packets sent alongside data packets or as payloads embedded within the data packets;
parsing at least one packet of a data flow of packets to identify a data flow class for the data flow, wherein the data flow class is associated with at least one network interface requirement for the data flow;
transmitting the test packets as a sequential burst of packets across a first network interface of the plurality of network interfaces:
for each packet of the packets in the data flow, providing the packet for routing over one of the plurality of network connections based on the data flow class and the bandwidth estimate of the plurality of network connections and the network connections of other packets in the data flow such that the packets in the data flow arrive at a destination node in a desired sequence; and wherein the bandwidth estimate of the first network interface is generated using a sum of packet sizes for packets between a first packet in the burst and a second packet in the burst that are divided by a time elapsed between a timestamp for the first packet and a timestamp for the second packet, wherein the first packet is not the initial packet in the burst, and wherein the second packet is subsequent to the first packet in the burst.

* * * * *